US012753333B2

(12) United States Patent
Koshikawa

(10) Patent No.: US 12,753,333 B2
(45) Date of Patent: Oct. 6, 2026

(54) CURABLE FLUOROPOLYETHER ADHESIVE COMPOSITION AND OPTICAL PART

(71) Applicant: SHIN-ETSU CHEMICAL CO., LTD., Tokyo (JP)

(72) Inventor: Hidenori Koshikawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1014 days.

(21) Appl. No.: 17/802,439

(22) PCT Filed: Feb. 15, 2021

(86) PCT No.: PCT/JP2021/005448
§ 371 (c)(1),
(2) Date: Aug. 25, 2022

(87) PCT Pub. No.: WO2021/172066
PCT Pub. Date: Sep. 2, 2021

(65) Prior Publication Data

US 2023/0112091 A1 Apr. 13, 2023

(30) Foreign Application Priority Data

Feb. 26, 2020 (JP) ................................ 2020-030390

(51) Int. Cl.

| | |
|---|---|
| ***C09J 171/02*** | (2006.01) |
| ***C08G 65/22*** | (2006.01) |
| ***C08G 77/08*** | (2006.01) |
| ***C08G 77/12*** | (2006.01) |
| ***C08G 77/14*** | (2006.01) |
| ***C08G 77/24*** | (2006.01) |
| ***C08K 5/54*** | (2006.01) |
| ***C09J 183/08*** | (2006.01) |

(52) U.S. Cl.

CPC .......... *C09J 171/02* (2013.01); *C08G 65/226* (2013.01); *C08G 77/08* (2013.01); *C08G 77/12* (2013.01); *C08G 77/14* (2013.01); *C08G 77/24* (2013.01); *C08K 5/5406* (2013.01); *C09J 183/08* (2013.01); *C09J 2400/143* (2013.01); *C09J 2471/00* (2013.01); *C09J 2483/00* (2013.01)

(58) Field of Classification Search

CPC ...... C09J 171/02; C09J 183/08; C09J 183/04; C09J 2400/143; C09J 2471/00; C09J 2483/00; C09J 171/00; C08G 65/226; C08G 77/08; C08G 77/12; C08G 77/14; C08G 77/24; C08G 65/007; C08G 65/336; C08K 5/5406; C08L 71/00

See application file for complete search history.

(56) References Cited

U.S. PATENT DOCUMENTS

| | | | | |
|---|---|---|---|---|
| 5,656,711 | A | 8/1997 | Fukuda et al. | |
| 5,665,846 | A | 9/1997 | Sato et al. | |
| 10,647,899 | B2 * | 5/2020 | Koshikawa | C09J 5/06 |
| 11,866,579 | B2 * | 1/2024 | Koshikawa | C08G 65/336 |
| 2002/0061969 | A1 | 5/2002 | Shiono et al. | |
| 2011/0237732 | A1 | 9/2011 | Matsuda et al. | |
| 2011/0257315 | A1 | 10/2011 | Shiono et al. | |
| 2013/0082300 | A1 | 4/2013 | Koshikawa et al. | |

FOREIGN PATENT DOCUMENTS

| | | | |
|---|---|---|---|
| JP | 9-95615 | A | 4/1997 |
| JP | 2990646 | B2 | 12/1999 |
| JP | 3239717 | B2 | 12/2001 |
| JP | 3562578 | B2 | 9/2004 |
| JP | 2011-219692 | A | 11/2011 |
| JP | 5246190 | B2 | 7/2013 |
| JP | 5459033 | B2 | 4/2014 |
| JP | 5653877 | B2 | 1/2015 |
| JP | 5956391 | B2 | 7/2016 |
| JP | 2016-216679 | A | 12/2016 |
| JP | 2017-132853 | A | 8/2017 |
| JP | 2019-89913 | A | 6/2019 |

OTHER PUBLICATIONS

International Search Report for PCT/JP2021/005448 mailed on May 11, 2021.
Written Opinion of the International Searching Authority for PCT/JP2021/005448 mailed on May 11, 2021.

* cited by examiner

*Primary Examiner* — Scott R. Walshon
(74) *Attorney, Agent, or Firm* — Birch, Stewart, Kolasch & Birch, LLP

(57) ABSTRACT

A curable fluoropolyether adhesive composition which comprises, each in a specific amount, (A) a straight-chain polyfluoro compound having two or more alkenyl groups per molecule and having a perfluoropolyether structure in the main chain, (B) a fluorine-containing organohydrogen siloxane having, per molecule, a perfluoroalkyl group, a perfluorooxyalkyl group, a perfluoroalkylene group or a perfluorooxyalkylene group and two or more SiH groups, and not having an epoxy group or an alkoxy group directly bonded to a silicon atom, (C) a platinum-group metal catalyst, and (D) a cyclic organopolysiloxane having, per molecule, an SiH group and an epoxy group and/or a trialkoxysilyl group bonded to a silicon atom via a divalent hydrocarbon group optionally containing an oxygen atom, and not having fluorine in molecule, and a cured product of which having a thickness of 2 mm shows a transmittance to light with a wavelength of 500 nm of 80% or higher. This curable fluoropolyether adhesive composition is capable of providing a cured product having good light transmittance and high adhesiveness to glass materials.

18 Claims, No Drawings

CURABLE FLUOROPOLYETHER ADHESIVE COMPOSITION AND OPTICAL PART

TECHNICAL FIELD

The present invention relates to a curable fluoropolyether adhesive agent composition and an optical component having a cured product of the composition.

BACKGROUND ART

Conventionally, as a fluorine-containing curable composition, a composition containing a linear fluoropolyether compound having at least two alkenyl groups in one molecule and having a perfluoropolyether structure in a main chain, a fluorine-containing organohydrogensiloxane having two or more hydrogen atoms directly bonded to a silicon atom in one molecule, and a platinum group metal compound has been proposed, and it has been disclosed that a cured product having an excellent balance among heat resistance, chemical resistance, solvent resistance, releasability, water repellency, oil repellency, low temperature characteristics and the like is obtained from the composition (Patent Document 1: JP 2990646).

In addition, as a composition that gives a cured product having more improved acid resistance than a cured product obtained from the composition described in Patent Document 1, a composition in which a linear fluoropolyether compound is changed has been proposed (Patent Document 2: JP 5246190).

Furthermore, a composition in which self-adhesive property to a metal and a plastic substrate is imparted by adding an organopolysiloxane having a hydrosilyl group (SiH group) and an epoxy group and/or a trialkoxysilyl group to these compositions has been proposed (Patent Document 3: JP 3239717 and Patent Document 4: JP 5459033).

In addition, a composition in which an organosiloxane having a cyclic carboxylic anhydride residue is added to the composition having self-adhesive property to improve adhesive property has been proposed (Patent Document 5: JP 3562578).

Incidentally, it has been proposed to use a composition having self-adhesive property and giving a cured product having good light transmittance for an optical component. For example, Patent Document 6: JP 5653877 introduces use of a material for sealing an optical semiconductor element. In addition, Patent Document 7: JP 5956391 introduces use as a surface layer material of a fixing member in an image forming apparatus equipped with a light reflection sensor.

However, the composition having self-adhesive property and giving a cured product having good light transmittance may have insufficient adhesive property to glass, and for example, if the composition is used as a coating material for a core material (made of glass) of an optical fiber, a defect of partial peeling occurrence often occurs. Therefore, improvement of adhesive property to glass has been desired.

PRIOR ART DOCUMENTS

Patent Documents

Patent Document 1: JP 2990646
Patent Document 2: JP 5246190
Patent Document 3: JP 3239717
Patent Document 4: JP 5459033
Patent Document 5: JP 3562578
Patent Document 6: JP 5653877
Patent Document 7: JP 5956391

SUMMARY OF INVENTION

Technical Problem

The present invention has been made in view of the above circumstances, and an object of the present invention is to provide a curable fluoropolyether adhesive agent composition that gives a cured product having good light transmittance and good adhesive property to glass, and an optical component having a cured product of the composition.

Solution to Problem

As a result of intensive studies, the present inventors have found that the above object can be achieved by blending a predetermined amount of a cyclic organopolysiloxane having a SiH group and an epoxy group and/or a trialkoxysilyl group in one molecule, and free of fluorine as a component having good light transmittance and improving adhesive property to glass, to a composition containing a predetermined component to be described later, and have completed the present invention.

Therefore, the present invention provides a curable fluoropolyether adhesive agent composition described below, and an optical component having a cured product of the composition.

[1]

A curable fluoropolyether adhesive agent composition containing:

(A) 100 parts by weight of a linear polyfluoro compound having two or more alkenyl groups in one molecule and having a perfluoropolyether structure in a main chain, (B) a fluorine-containing organohydrogensiloxane having, in one molecule, a monovalent perfluoroalkyl group or a monovalent perfluorooxyalkyl group, or having a divalent perfluoroalkylene group or a divalent perfluorooxyalkylene group, and further having two or more hydrogen atoms directly bonded to silicon atoms (SiH groups), and free of an epoxy group and an alkoxy group directly bonded to a silicon atom in the molecule, (C) 0.1 to 2,000 ppm in terms of the weight of platinum group metal atoms with respect to the component (A) of a platinum group metal-based catalyst, and (D) 0.01 to 5 parts by weight of a cyclic organopolysiloxane having, in one molecule, a hydrogen atom directly bonded to a silicon atom (SiH group), and an epoxy group or trialkoxysilyl group bonded to a silicon atom via a divalent hydrocarbon group which may contain an oxygen atom, or both groups, and free of fluorine in the molecule, wherein the compounding amount of the component (B) is an amount such that the amount of hydrogen atoms directly bonded to silicon atoms in the component (B) is 0.5 to 3 mol, based on 1 mol of alkenyl groups contained in the composition, and the transmittance to light of 500 nm wavelength of a cured product having a thickness of 2 mm obtained by curing the composition is 80% or more.

[2]

The curable fluoropolyether adhesive agent composition according to [1], wherein the alkenyl group content of the linear polyfluoro compound as the component (A) is 0.005 to 0.3 mol/100 g.

[3]

The curable fluoropolyether adhesive agent composition according to [1] or [2], wherein the perfluoropolyether structure of the component (A) contains a structure having the following general formula (1):

$$-(C_aF_{2a}O)_b- \quad (1)$$

wherein a is an integer of 1 to 6, and b is an integer of 1 to 300.

[4]

The curable fluoropolyether adhesive agent composition according to any one of [1] to [3], wherein the component (A) is a linear polyfluoro compound having the following general formula (2):

[Chem. 1]

(2)

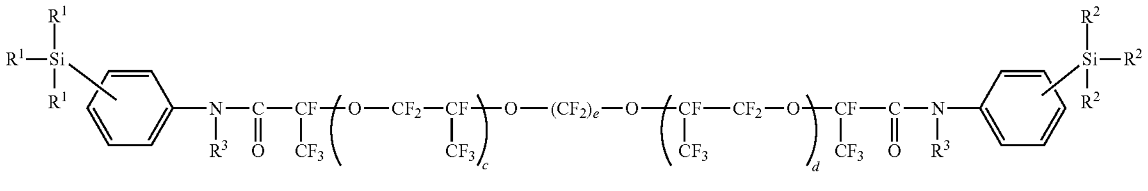

wherein $R^1$ and $R^2$ are alkenyl groups or monovalent hydrocarbon groups free of unsubstituted or substituted aliphatic unsaturated bond, $R^1$ is independent of each other, $R^2$ is also independent of each other, 2 or more of a total of 6 of $R^1$ and $R^2$ are alkenyl groups, $R^3$ is each independently a hydrogen atom or an unsubstituted or substituted monovalent hydrocarbon group, c and d are each an integer of 1 to 150, the average value of c+d is 2 to 300, and e is an integer of 1 to 6, and/or the following general formula (3):

[Chem. 2]

(3)

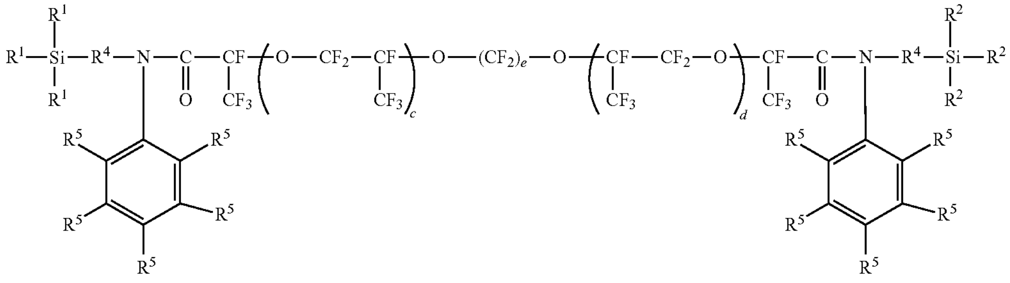

wherein $R^1$ and $R^2$ are alkenyl groups or monovalent hydrocarbon groups free of unsubstituted or substituted aliphatic unsaturated bond, $R^1$ is independent of each other, $R^2$ is also independent of each other, 2 or more of a total of 6 of $R^1$ and $R^2$ are alkenyl groups, $R^4$ is each independently an alkylene group having 1 to 6 carbon atoms, $R^5$ is each independently a hydrogen atom or an alkyl group having 1 to 4 carbon atoms which may be substituted with fluorine, c and d are each an integer of 1 to 150, the average value of c+d is 2 to 300, and e is an integer of 1 to 6.

[5]

The curable fluoropolyether adhesive agent composition according to any one of [1] to [4], wherein the component (D) is a cyclic organopolysiloxane having the following general formula (4):

[Chem. 3]

(4)

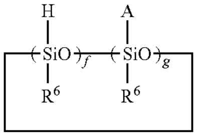

wherein f is an integer of 1 to 6, g is an integer of 1 to 4, and f+g is an integer of 4 to 10, $R^6$ is each independently an unsubstituted or substituted alkyl group or aryl group having 1 to 20 carbon atoms, and A is each independently an epoxy group or trialkoxysilyl group bonded to a silicon atom via a divalent hydrocarbon group which may contain an oxygen atom, provided that the order of bonding of —(SiO)(H)$R^6$— and —(SiO)(A)$R^6$— is not limited.

[6]

The curable fluoropolyether adhesive agent composition according to any one of [1] to [5], further containing:

0.1 to 10 parts by weight of (E) a cyclic organopolysiloxane having, in one molecule, a hydrogen atom directly bonded to a silicon atom (SiH group), a monovalent perfluoroalkyl group or a monovalent perfluorooxyalkyl group, and an epoxy group or trialkoxysilyl group bonded to a silicon atom via a divalent hydrocarbon group which may contain an oxygen atom, or both groups, per 100 parts by weight of the component (A).

[7]

The curable fluoropolyether adhesive agent composition according to [6], wherein the component (E) is a cyclic organopolysiloxane having the following general formula (5):

[Chem. 4]

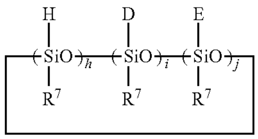

(5)

wherein h is an integer of 1 to 6, i is an integer of 1 to 4, j is an integer of 1 to 4, and h+i+j is an integer of 4 to 10, $R^7$ is each independently an unsubstituted or substituted alkyl group or aryl group having 1 to 20 carbon atoms, D is each independently a monovalent perfluoroalkyl group or a monovalent perfluorooxyalkyl group bonded to a silicon atom via a divalent hydrocarbon group which may contain a silicon atom, an oxygen atom and a nitrogen atom, and E is each independently an epoxy group or trialkoxysilyl group bonded to a silicon atom via a divalent hydrocarbon group which may contain an oxygen atom, provided that the order of bonding of —(SiO)(H)$R^7$—, —(SiO)(D)$R^7$— and —(SiO)(E)$R^7$— is not limited.

[8]

The curable fluoropolyether adhesive agent composition according to any one of [1] to [7], wherein an adherend is glass.

[9]

An optical component having a cured product of the curable fluoropolyether adhesive agent composition according to any one of [1] to [8].

[10]

The optical component according to [9], containing glass as a constituent material.

Advantageous Effects of Invention

According to the present invention, it is possible to provide a curable fluoropolyether adhesive agent composition that gives a cured product having good light transmittance and good adhesive property to glass, and an optical component having a cured product of the composition.

DESCRIPTION OF EMBODIMENTS

Hereinafter, the present invention is described in detail.

<Curable Fluoropolyether Adhesive Agent Composition>

The curable fluoropolyether adhesive agent composition of the present invention contains the following components (A) to (D).

[Component (A)]

The component (A) is a linear polyfluoro compound having two or more alkenyl groups in one molecule and further having a perfluoropolyether structure in a main chain.

The alkenyl group contained in the component (A) is preferably an alkenyl group having 2 to 8 carbon atoms, particularly 2 to 6 carbon atoms and having a $CH_2$=CH— structure at the terminal (external olefin), and examples thereof include a vinyl group, an allyl group, a propenyl group, an isopropenyl group, a butenyl group, a hexenyl group, and the like, and among them, a vinyl group and an allyl group are particularly preferred.

The alkenyl group content of the linear polyfluoro compound as the component (A) is preferably 0.005 to 0.3 mol/100 g, and further preferably 0.007 to 0.2 mol/100 g. If the alkenyl group content is 0.005 mol/100 g or more, the degree of crosslinking of the composition of the present invention becomes sufficient, and there is no possibility that curing defects occur. On the other hand, if the alkenyl group content is 0.3 mol/100 g or less, there is no possibility that the mechanical properties of the cured product (fluoropolyether rubber elastic body) obtained by curing the composition of the present invention are impaired. The alkenyl group content can be calculated from $^1$H-NMR using an internal standard substance.

The perfluoropolyether structure of the component (A) contains many repeating units of $$—C_aF_{2a}O—$$

wherein a is an integer of 1 to 6, and examples thereof include those having the following general formula (1):

$$—(C_aF_{2a}O)_b— \quad (1)$$

wherein a is an integer of 1 to 6, and b is an integer of 1 to 300, preferably an integer of 1 to 200.

Examples of the repeating units of —$C_aF_{2a}$O— include units of the following formulas:

$—CF_2O—$, $—CF_2CF_2O—$, $—CF_2CF_2CF_2O—$, $—CF(CF_3)CF_2O—$, $—CF_2CF_2CF_2CF_2O—$, $—CF_2CF_2CF_2CF_2CF_2CF_2O—$, $—C(CF_3)_2O—$ and the like.

Among them, in particular, the repeating units of the following formulas:

$—CF_2O—$, $—CF_2CF_2O—$, $—CF_2CF_2CF_2O—$, and $—CF(CF_3)CF_2O—$ are preferred.

The perfluoropolyether structure of the component (A) may be composed of one of the above repeating units, or may be composed of a combination of two or more thereof.

Preferred examples of the component (A) include linear polyfluoro compounds having the following general formula (2) and the following general formula (3):

[Chem. 5]

(2)

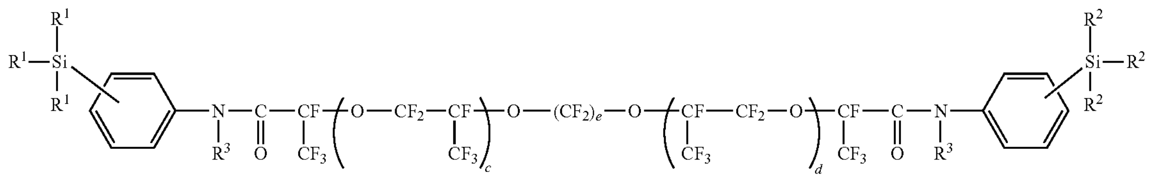

wherein $R^1$ and $R^2$ are alkenyl groups or monovalent hydrocarbon groups free of unsubstituted or substituted aliphatic unsaturated bond, $R^1$ is independent of each other, $R^2$ is also independent of each other, 2 or more of a total of 6 of $R^1$ and $R^2$ are alkenyl groups, $R^3$ is each independently a hydrogen atom or an unsubstituted or substituted monovalent hydrocarbon group, c and d are each an integer of 1 to 150, the average value of c+d is 2 to 300, and e is an integer of 1 to 6.

[Chem. 6]

(3)

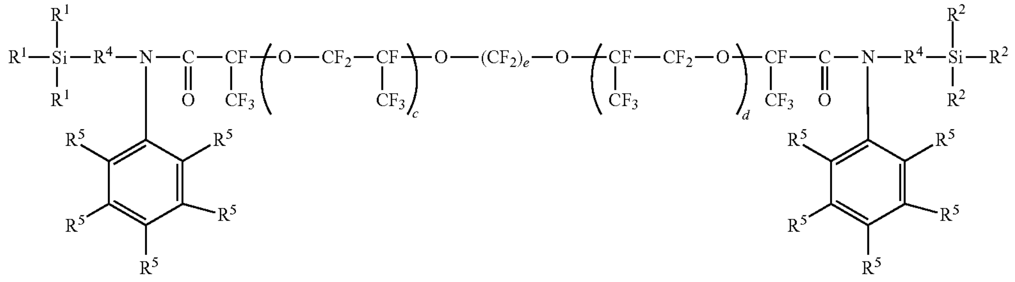

wherein $R^1$ and $R^2$ are alkenyl groups or monovalent hydrocarbon groups free of unsubstituted or substituted aliphatic unsaturated bond, $R^1$ is independent of each other, $R^2$ is also independent of each other, 2 or more of a total of 6 of $R^1$ and $R^2$ are alkenyl groups, $R^4$ is each independently an alkylene group having 1 to 6 carbon atoms, $R^5$ is each independently a hydrogen atom or an alkyl group having 1 to 4 carbon atoms which may be substituted with fluorine, c and d are each an integer of 1 to 150, the average value of c+d is 2 to 300, and e is an integer of 1 to 6.

Here, examples of the alkenyl group contained in $R^1$ and $R^2$ include the same as those exemplified as the alkenyl group contained in the component (A), and the monovalent hydrocarbon group free of unsubstituted or substituted aliphatic unsaturated bond other than the alkenyl group is preferably a monovalent hydrocarbon group having 1 to 12 carbon atoms, particularly preferably a monovalent hydrocarbon group having 1 to 10 carbon atoms, and specific examples include alkyl groups such as a methyl group, an ethyl group, a propyl group, a butyl group, a hexyl group, a cyclohexyl group, and an octyl group; aryl groups such as a phenyl group and a tolyl group; aralkyl groups such as a benzyl group and a phenylethyl group; and the like, and monovalent hydrocarbon groups in which some or all of hydrogen atoms of these groups are substituted with halogen atoms such as fluorine, and the like. As $R^1$ and $R^2$, among them, a vinyl group, an allyl group, a methyl group, and an ethyl group are particularly preferred.

Note that $R^1$ is independent of each other, $R^2$ is also independent of each other, and 2 or more of a total of 6 (2 to 6) of $R^1$ and $R^2$ are alkenyl groups, but it is preferable that 1 or more of each of $R^1$ and $R^2$ (that is, 1 to 3 each of $R^1$ and $R^2$) are alkenyl groups, particularly vinyl groups or allyl groups.

Examples of the unsubstituted or substituted monovalent hydrocarbon group contained in $R^3$ include the same groups as those exemplified above for the monovalent hydrocarbon group free of unsubstituted or substituted aliphatic unsaturated bond for $R^1$ and $R^2$. $R^3$ is preferably a hydrogen atom, a methyl group or an ethyl group.

$R^4$ is an alkylene group having 1 to 6 carbon atoms, preferably 2 to 6 carbon atoms, and specific examples thereof include a methylene group, an ethylene group, a propylene group (trimethylene group, methylethylene group), a butylene group (tetramethylene group, methylpropylene group), a hexamethylene group, and the like, and an ethylene group and a propylene group are particularly preferred.

$R^5$ is each independently a hydrogen atom or an alkyl group having 1 to 4 carbon atoms which may be substituted with fluorine, and specific examples of the alkyl group having 1 to 4 carbon atoms which may be substituted with fluorine include alkyl groups such as a methyl group, an ethyl group, a propyl group and a butyl group, and groups in which some or all of hydrogen atoms of these groups are substituted with fluorine atoms, for example, a trifluoromethyl group, and the like. Among them, a hydrogen atom is preferred.

Each of c and d is preferably an integer of 1 to 150, more preferably an integer of 1 to 100, and the average value of c+d is preferably 2 to 300, more preferably 2 to 200. Also, e is preferably an integer of 1 to 6, more preferably an integer of 1 to 4.

Specific examples of the linear polyfluoro compound having the general formula (2) include those having the following formulas. Me represents a methyl group, and Et represents an ethyl group.

[Chem. 7]

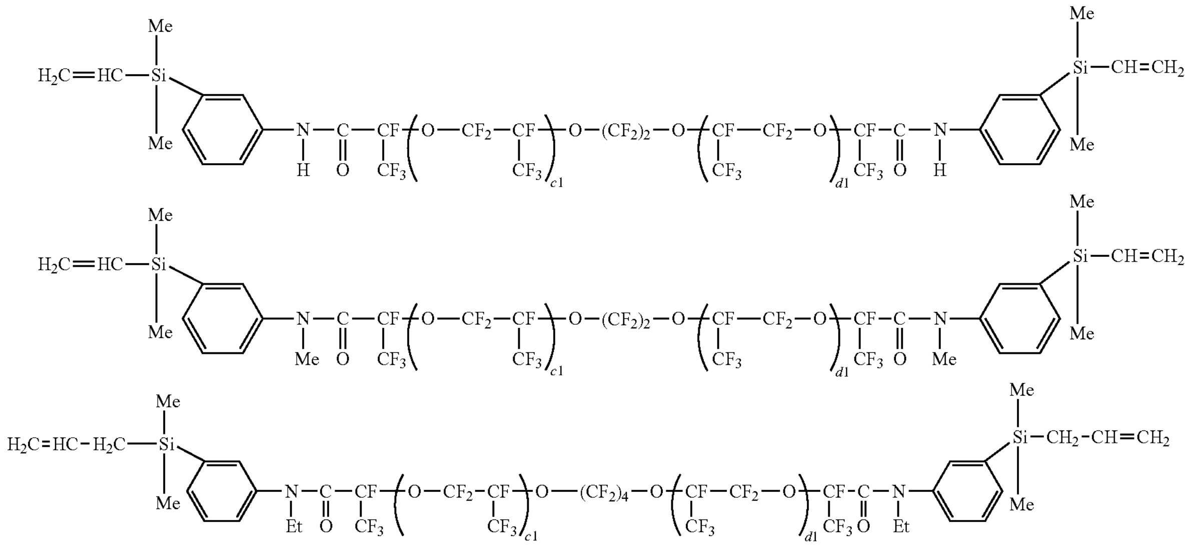

wherein c1 and d1 are each an integer of 1 to 150.

[Chem. 8]

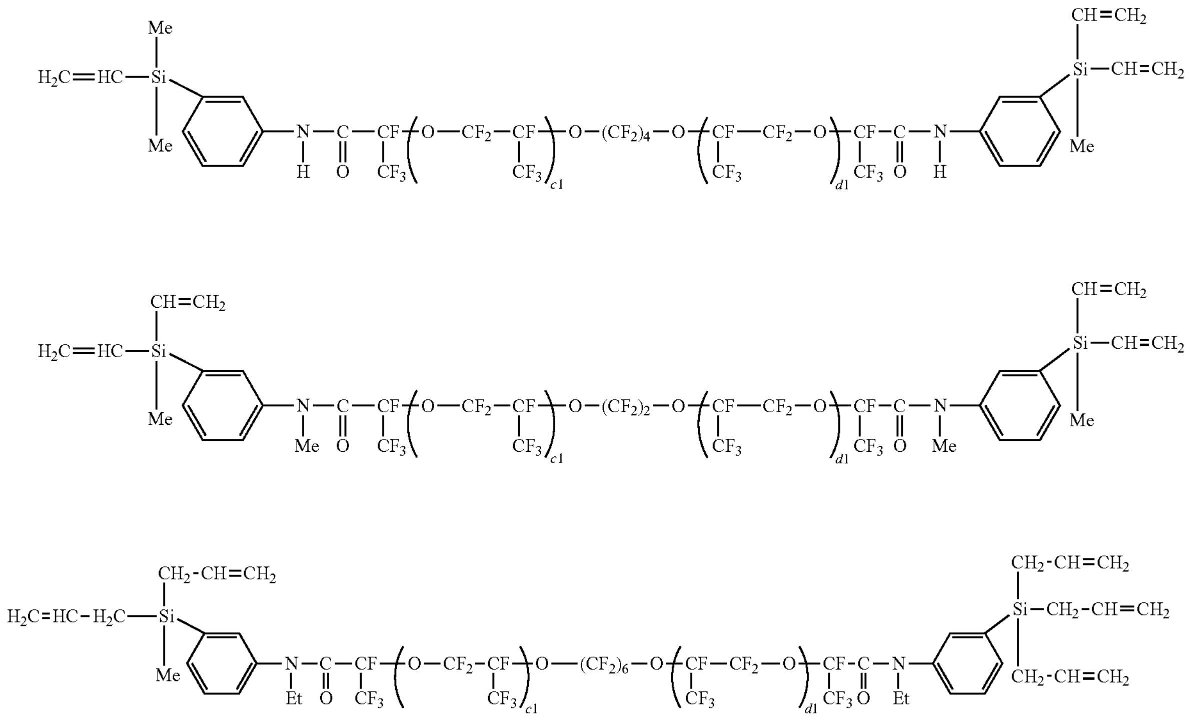

wherein c1 and d1 are each an integer of 1 to 150.

[Chem. 9]
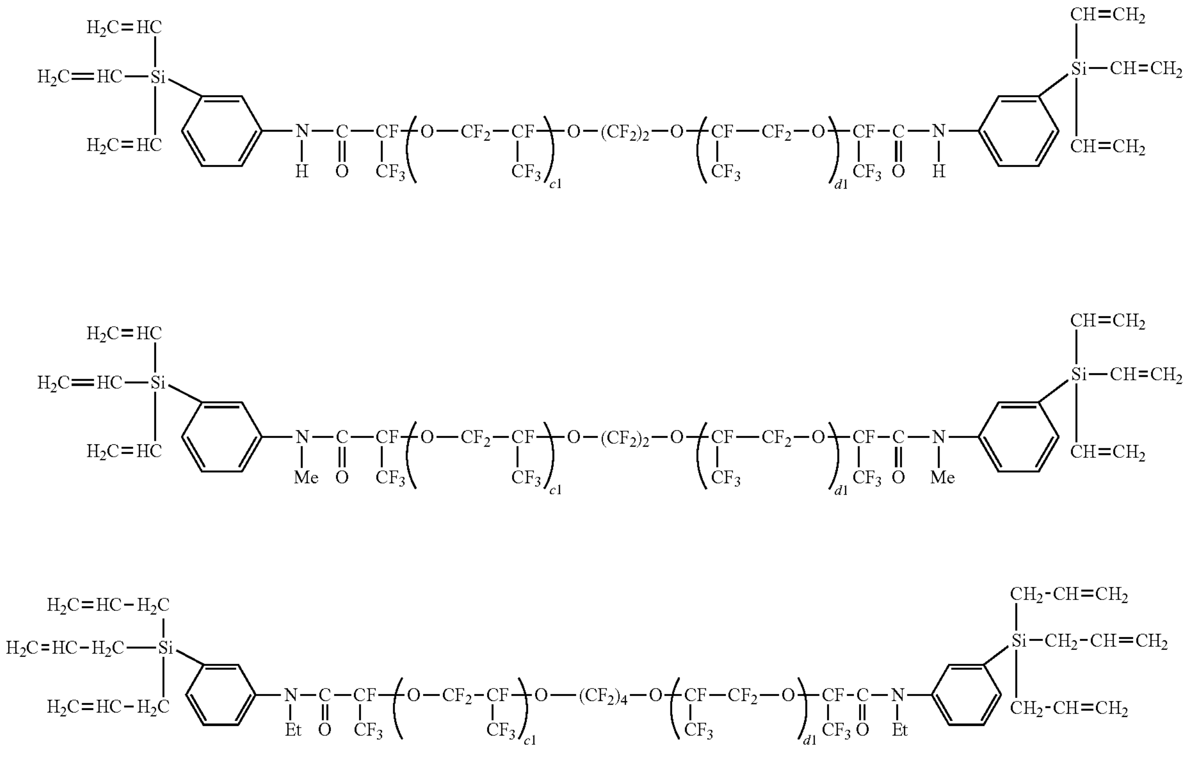
wherein c1 and d1 are each an integer of 1 to 150.
Specific examples of the linear polyfluoro compound having the general formula (3) include those having the following formulas:
[Chem. 10]
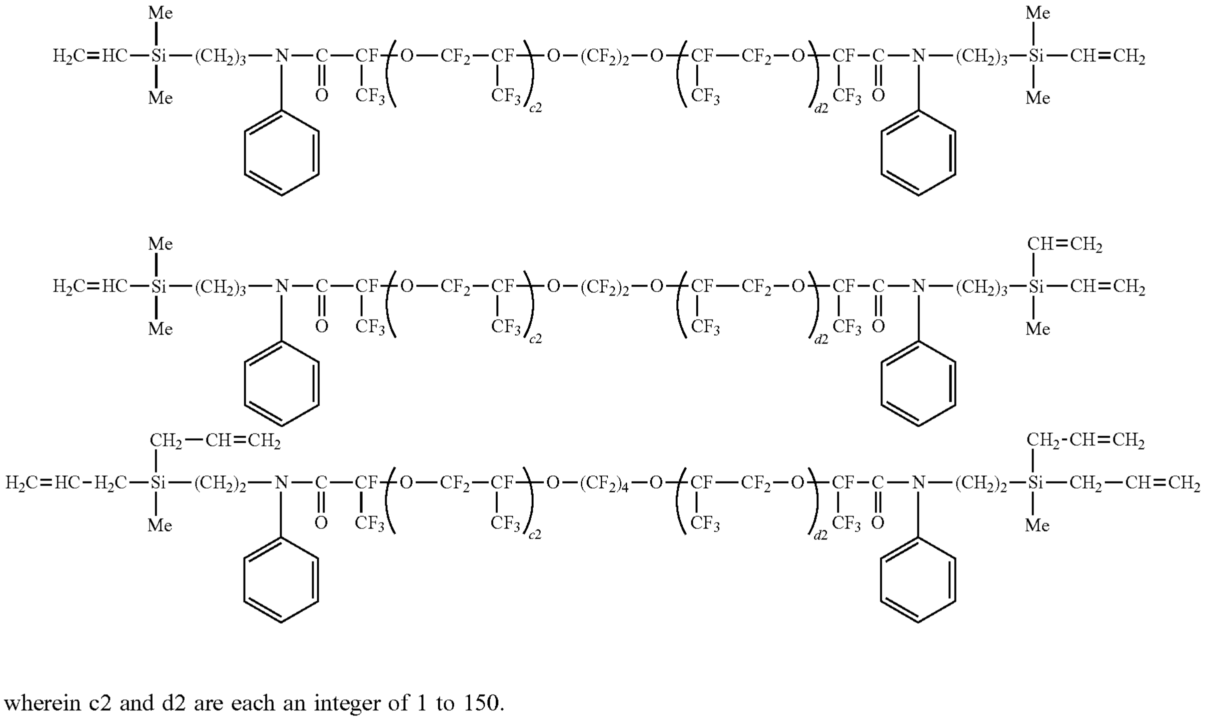
wherein c2 and d2 are each an integer of 1 to 150.

[Chem. 11]

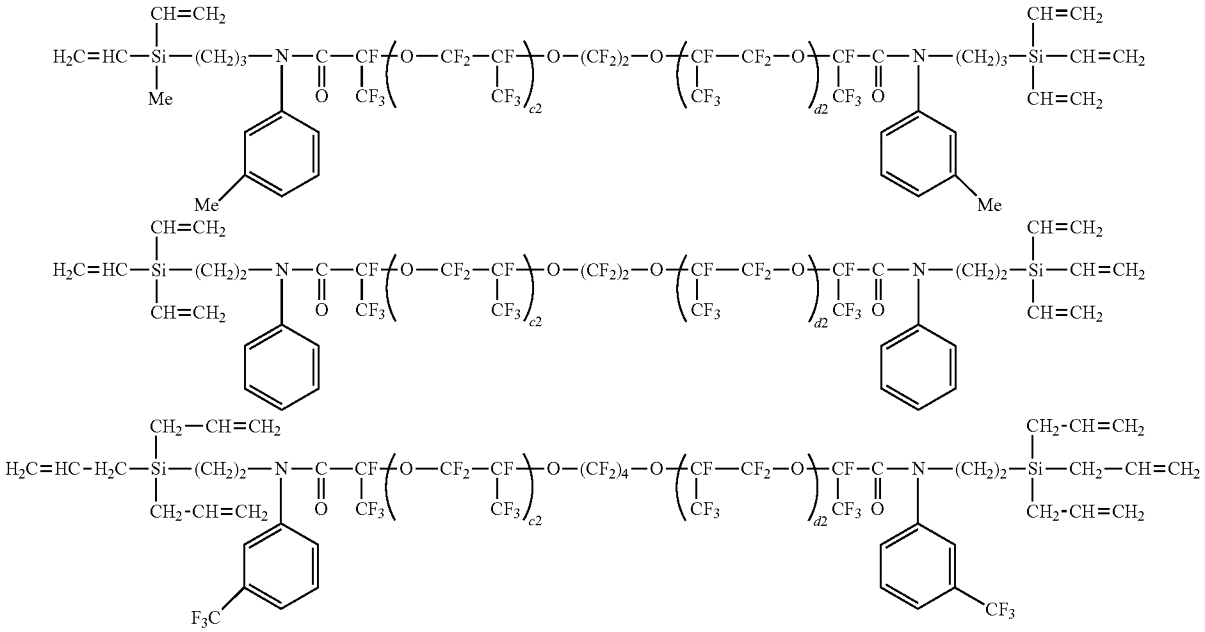

wherein c2 and d2 are each an integer of 1 to 150.

In the present invention, the viscosity can be measured by a rotational viscometer (for example, BL type, BH type, BS type, cone plate type, rheometer, and the like), and in particular, the viscosity (23° C.) of the linear polyfluoro compound having the general formula (2) or (3) is preferably 500 to 100,000 mPa·s, particularly 1,000 to 50,000 mPa·s in the viscosity measurement specified in JIS K7117-1. If the viscosity is 500 mPa·s or more, there is no possibility that storage stability of the composition of the present invention is deteriorated, and if the viscosity is 100,000 mPa·s or less, there is no possibility that extensibility of the resulting composition is deteriorated.

Further, the polymerization degree (or molecular weight) of the linear polyfluoro compound reflecting the number of repetitions of the perfluorooxyalkylene unit constituting the perfluoropolyether structure of a main chain can be determined, for example, as a numerical average polymerization degree (or numerical average molecular weight average molecular weight) in terms of polystyrene in gel permeation chromatography (GPC) analysis using a fluorine-based solvent as a developing solvent. Furthermore, the numerical average polymerization degree (or numerical average molecular weight average molecular weight) of the linear polyfluoro compound can also be calculated from $^{19}$F-NMR.

These linear polyfluoro compounds can be used singly or in combination of two or more kinds thereof. That is, among the linear polyfluoro compounds having the general formula (2) or (3), one kind can be used singly or two or more kinds can be used in combination, and the linear polyfluoro compounds having the general formulas (2) and (3) can also be used in combination.

[Component (B)]

The component (B) is a fluorine-containing organohydrogensiloxane having, in one molecule, a monovalent perfluoroalkyl group or a monovalent perfluorooxyalkyl group, or having a divalent perfluoroalkylene group or a divalent perfluorooxyalkylene group, and further having two or more hydrogen atoms directly bonded to silicon atoms (SiH groups), and free of an epoxy group and an alkoxy group directly bonded to a silicon atom in the molecule, preferably a fluorine-containing organohydrogensiloxane having one or more of the monovalent or divalent fluorine-containing organic groups and two or more hydrogen atoms directly bonded to silicon atoms in one molecule, and free of other functional groups other than SiH groups such as an epoxy group and an alkoxy group directly bonded to a silicon atom, and functions as a crosslinking agent of the component (A).

Here, the "other functional groups" exclude divalent polar groups (polar structures) such as an ether-bonding oxygen atom, an amide bond, a carbonyl bond and an ester bond, which may be contained in a divalent linking group which links a perfluoroalkyl group, a perfluorooxyalkyl group, a perfluoroalkylene group or a perfluorooxyalkylene group to a silicon atom constituting polysiloxane.

The component (B) is clearly distinguished from the component (E) as an adhesion-imparting agent described later in that the component (B) does not have an epoxy group and an alkoxy group directly bonded to a silicon atom (alkoxysilyl group) in the molecule. Further, the component (B) is also clearly distinguished from the component (G) as a curing agent for an epoxy resin described later in that the component (B) does not have a carboxylic acid anhydride group in the molecule.

The monovalent perfluoroalkyl group, the monovalent perfluorooxyalkyl group, the divalent perfluoroalkylene group, and the divalent perfluorooxyalkylene group are groups introduced from the viewpoint of compatibility with the component (A), dispersibility, uniformity after curing, and the like.

Examples of the monovalent perfluoroalkyl group or monovalent perfluorooxyalkyl group include groups having the following general formula (6) or (7):

$$C_oF_{2o+1}— \quad (6)$$

wherein o is an integer of 1 to 10, preferably an integer of 3 to 7.

[Chem. 12]

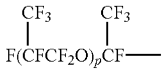

(7)

wherein p is an integer of 1 to 50, preferably an integer of 2 to 30.

Examples of the divalent perfluoroalkylene group or divalent perfluorooxyalkylene group include groups having the following general formulas (8) to (10):

$$—C_qF_{2q}— \quad (8)$$

wherein q is an integer of 1 to 20, preferably an integer of 2 to 10.

[Chem. 13]

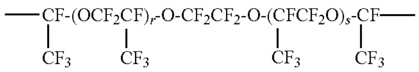

(9)

wherein r and s are each an integer of 1 or more, preferably an integer of 1 to 100, and the average value of r+s is 2 to 200, preferably 2 to 100.

$$—CF_2O—(CF_2CF_2O)_t(CF_2O)_u—CF_2— \quad (10)$$

wherein t and u are each an integer of 1 to 50, preferably an integer of 1 to 30, the average value of t+u is 2 to 100, preferably 2 to 60, and the repeating units may be randomly arranged.

In addition, it is preferable that the perfluoroalkyl group, the perfluorooxyalkyl group, the perfluoroalkylene group, or the perfluorooxyalkylene group and the silicon atom constituting polysiloxane are connected by a divalent linking group. The divalent linking group is preferably an unsubstituted or substituted divalent hydrocarbon group having 2 to 13 carbon atoms, particularly 2 to 8 carbon atoms, which may have an oxygen atom, a nitrogen atom, or a silicon atom. Specifically, alkylene groups, arylene groups, and combinations thereof, or groups in which one or more kinds of structures selected from the group consisting of an ether-bonding oxygen atom, an amide bond, a carbonyl bond, an ester bond, and diorganosilylene groups such as a dimethylsilylene group are intervened in these groups or the like can be exemplified, and examples thereof include those having 2 to 13 carbon atoms such as $—CH_2CH_2—$, $—CH_2CH_2CH_2—$, $—CH_2CH_2CH_2OCH_2—$, $—CH_2CH_2CH_2—NH—CO—$, $—CH_2CH_2CH_2—N(Ph)\text{-}CO—$, $—CH_2CH_2CH_2—N(CH_3)—CO—$, $—CH_2CH_2CH_2—N(CH_2CH_3)—CO—$, $—CH_2CH_2CH_2—N(CH(CH_3)_2)—CO—$, $—CH_2CH_2CH_2—O—CO—$, $—CH_2CH_2\text{-}Si(CH_3)_2\text{-}Ph'\text{-}N(CH_3)—CO—$, $—CH_2CH_2CH_2—Si(CH_3)_2\text{-}Ph'\text{-}N(CH_3)—CO—$, provided that Ph is a phenyl group and Ph' is a phenylene group. In each of these groups, the left end is bonded to a silicon atom, and the right end is bonded to a carbon atom.

Further, the monovalent or divalent fluorine-containing organic group and the monovalent substituent bonded to the silicon atom other than the hydrogen atom directly bonded to the silicon atom in the fluorine-containing organohydrogensiloxane as the component (B) are an unsubstituted or substituted alkyl group or aryl group having 1 to 20, preferably 1 to 12 carbon atoms, and examples thereof include alkyl groups such as a methyl group, an ethyl group, a propyl group, a butyl group, a hexyl group, a cyclohexyl group, an octyl group, and a decyl group; aryl groups such as a phenyl group, a tolyl group, and a naphthyl group, and for example, a chloromethyl group, a chloropropyl group, and a cyanoethyl group in which some or all of hydrogen atoms of these groups are substituted with a halogen atom such as a chlorine atom, a cyano group, and the like. Among them, a methyl group is preferred. The fluorine-containing organohydrogensiloxane does not have an epoxy group, an alkoxy group and a carboxylic acid anhydride group.

The structure of the fluorine-containing organohydrogensiloxane as the component (B) may be any of cyclic, chain, three-dimensional network, and a combination thereof. The number of silicon atoms of the fluorine-containing organohydrogensiloxane is not particularly limited, but is usually about 2 to 60, preferably about 3 to 30, and more preferably about 4 to 30.

Moreover, the component (B) has 2 or more, preferably 3 or more SiH groups in one molecule, and the content of the SiH groups is preferably 0.0001 to 0.02 mol/g, further preferably 0.0002 to 0.01 mol/g. The SiH group content is calculated by an average molecular formula (average structural formula). (The same applies hereinafter).

Examples of the component (B) include those having the following general formulas (11) to (17):

[Chem. 14]

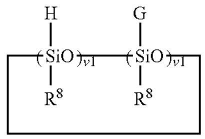

(11)

wherein G is each independently the monovalent perfluoroalkyl group or the monovalent perfluorooxyalkyl group bonded to a silicon atom constituting siloxane via a divalent hydrocarbon group which may have an oxygen atom, a nitrogen atom or a silicon atom, described above, and examples of the monovalent perfluoroalkyl group or the monovalent perfluorooxyalkyl group include groups having the general formula (6) or (7), $R^8$ is each independently the unsubstituted or substituted alkyl group or aryl group having 1 to 20, preferably 1 to 12 carbon atoms, described above, v1 is an integer of 2 to 6, preferably an integer of 3 to 6, w1 is an integer of 1 to 4, preferably an integer of 1 to 3, and v1+w1 is an integer of 4 to 10, preferably an integer of 4 to 9, provided that the order of bonding of $—(Si(H)(R^8)O)—$ and $—(Si(G)(R^8)O)—$ is not limited.

[Chem. 15]

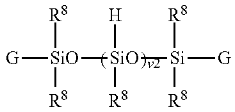

(12)

wherein G is each independently the same as G above, $R^8$ is each independently the same as $R^8$ above, and v2 is an integer of 2 to 50, preferably an integer of 3 to 30.

[Chem. 16]

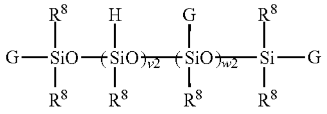

(13)

wherein G is each independently the same as G above, $R^8$ is each independently the same as $R^8$ above, and v2 is an integer of 2 to 50, preferably an integer of 3 to 30, w2 is an integer of 1 to 40, preferably an integer of 1 to 20, and v2+w2 is an integer of 4 to 60, preferably an integer of 4 to 50, provided that the order of bonding of —(Si(H)($R^8$)O)— and —(Si(G)($R^8$)O)— is not limited.

[Chem. 17]

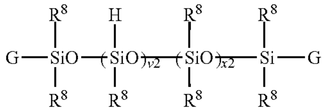

(14)

wherein G is each independently the same as G above, $R^8$ is each independently the same as $R^8$ above, and v2 is an integer of 2 to 50, preferably an integer of 3 to 30, x2 is an integer of 1 to 40, preferably an integer of 1 to 20, and v2+x2 is an integer of 4 to 60, preferably an integer of 4 to 50, provided that the order of bonding of —(Si(H)($R^8$)O)— and —(Si($R^8$)$_2$O)— is not limited.

[Chem. 18]

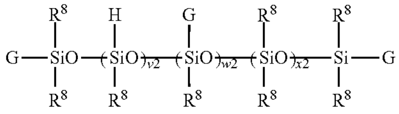

(15)

wherein G is each independently the same as G above, $R^8$ is each independently the same as $R^8$ above, and v2 is an integer of 2 to 50, preferably an integer of 3 to 30, w2 is an integer of 1 to 40, preferably an integer of 1 to 20, x2 is an integer of 1 to 40, preferably an integer of 1 to 20, and v2+w2+x2 is an integer of 5 to 60, preferably an integer of 5 to 50, provided that the order of bonding of —(Si(H)($R^8$)O)—, —(Si(G)($R^8$)O)— and —(Si($R^8$)$_2$O)— is not limited.

[Chem. 19]

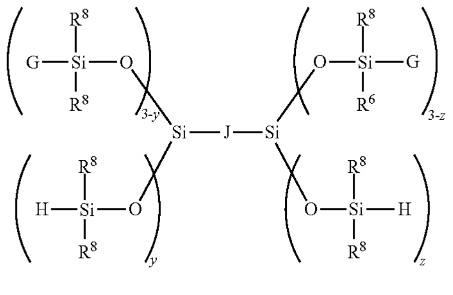

(16)

wherein J is a divalent perfluoroalkylene group or a divalent perfluorooxyalkylene group each bonded to an adjacent silicon atom via an oxygen atom, an alkylene group, or a divalent hydrocarbon group which may have an oxygen atom or a nitrogen atom, and examples of the divalent perfluoroalkylene group or the divalent perfluorooxyalkylene group include any of the groups having the general formulas (8) to (10), wherein G is each independently the same as G above, R8 is each independently the same as R8 above, and y is an integer of 0 to 3, z is an integer of 0 to 3, and y+z is an integer of 2 to 6, preferably an integer of 3 to 5, provided that, when J is an oxygen atom or an alkylene group, y+z is an integer of 2 to 5, preferably an integer of 3 to 5.

[Chem. 20]

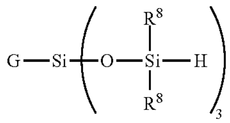

(17)

wherein G is the same as G above, and $R^8$ is each independently the same as $R^8$ above.

Specific examples of the component (B) include the following compounds. These compounds may be used singly or in combination of two or more thereof. In the following formulas, Me represents a methyl group, and Ph represents a phenyl group. The sequence of each divalent siloxane unit in the molecule can be either random, alternating, or block.

[Chem. 21]

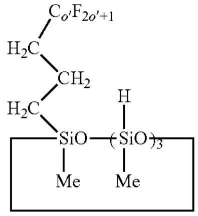

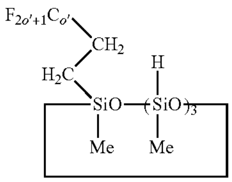

-continued
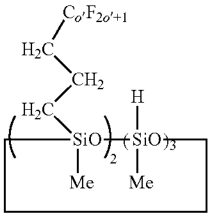
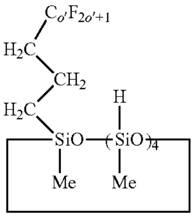
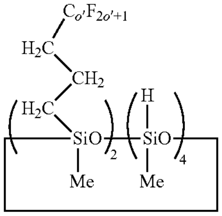
wherein o' is an integer of 1 to 10.
[Chem. 22]
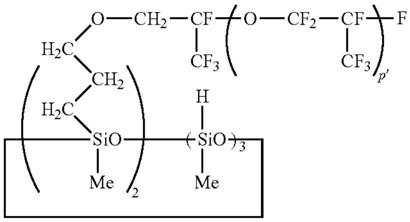
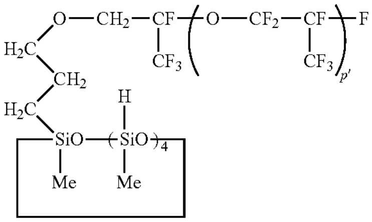
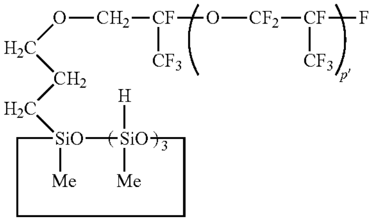
-continued
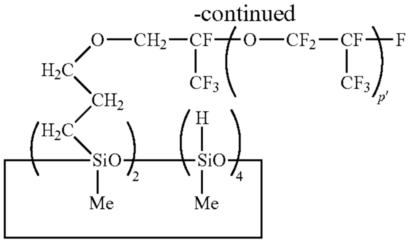
wherein p' is an integer of 1 to 50.
[Chem. 23]
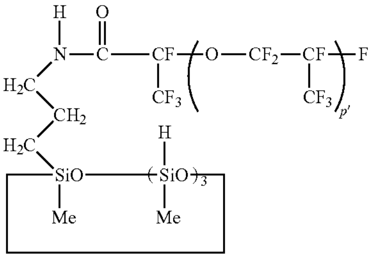
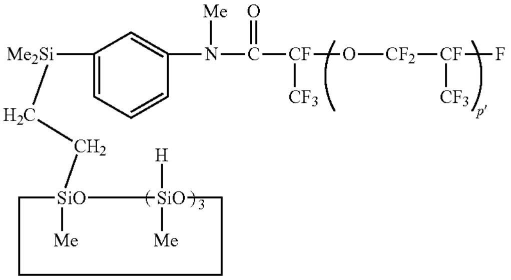
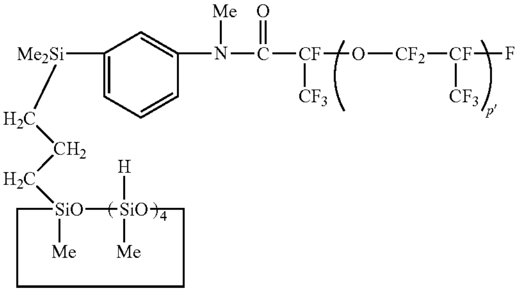
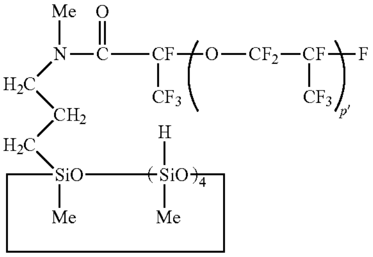
wherein p' is an integer of 1 to 50.
[Chem. 24]
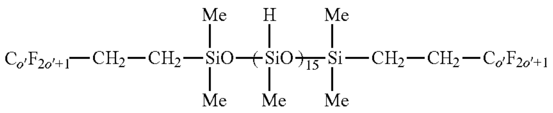

-continued
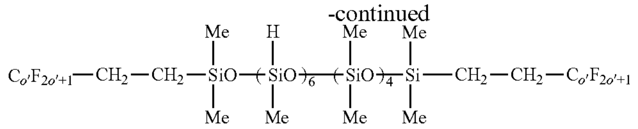
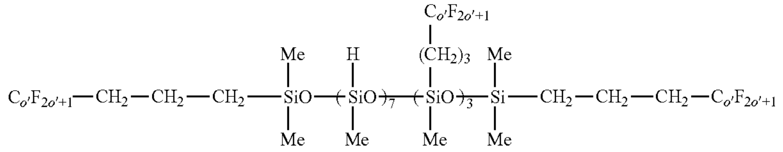
wherein o' is an integer of 1 to 10.
[Chem. 25]
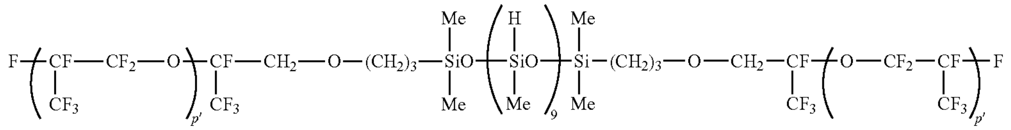
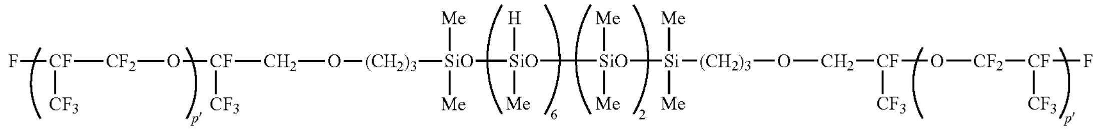
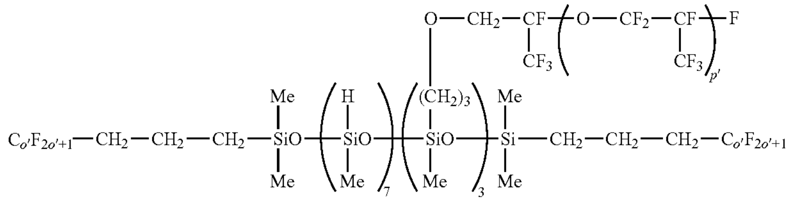
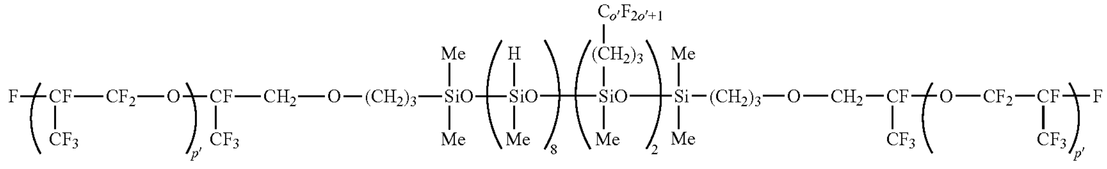
wherein o' is an integer of 1 to 10 and p' is an integer of 1 to 50.
[Chem. 26]
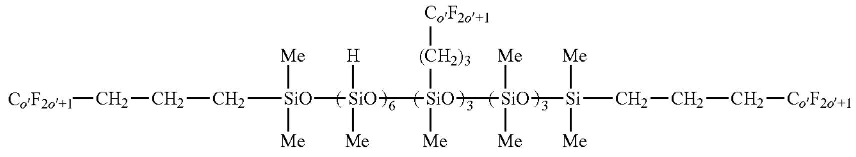
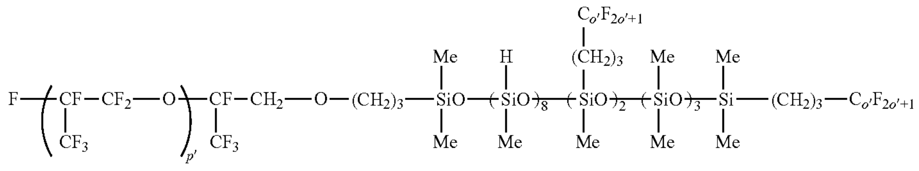

-continued
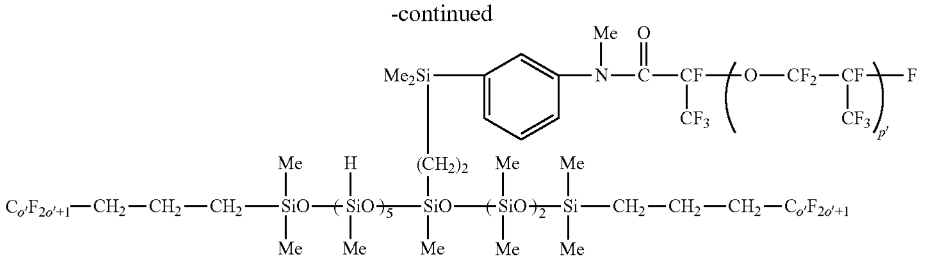
wherein o' is an integer of 1 to 10 and p' is an integer of 1 to 50.
[Chem. 27]
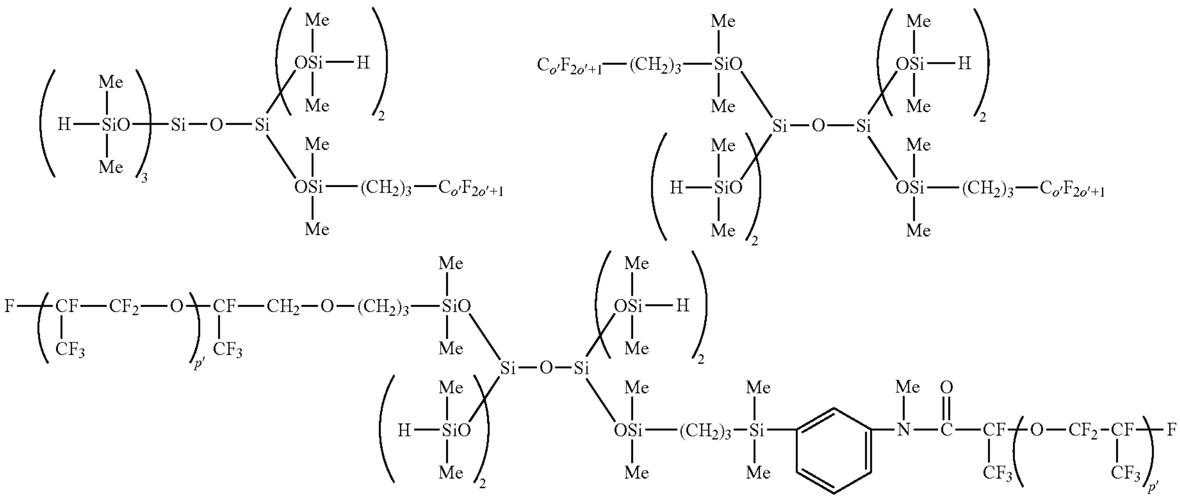
wherein o' is an integer of 1 to 10 and p' is an integer of 1 to 50.
[Chem. 28]
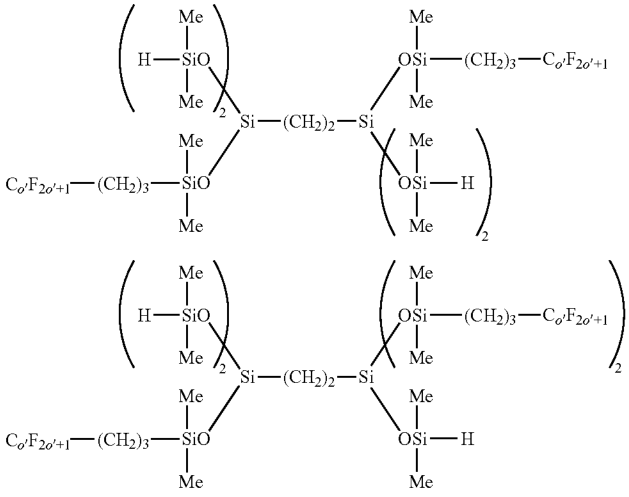

-continued
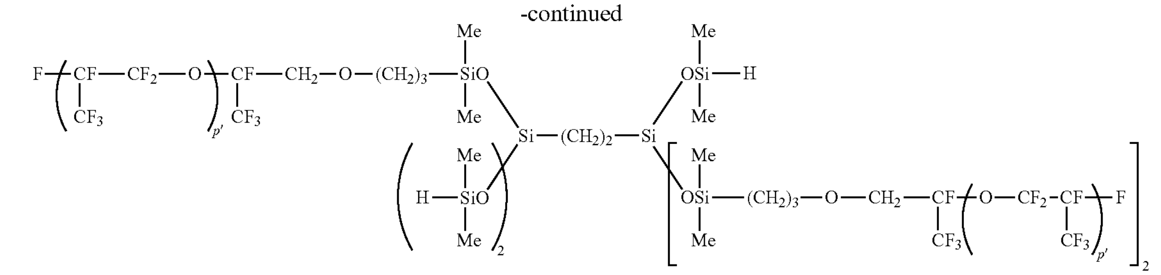
wherein o' is an integer of 1 to 10 and p' is an integer of 1 to 50.
[Chem. 29]
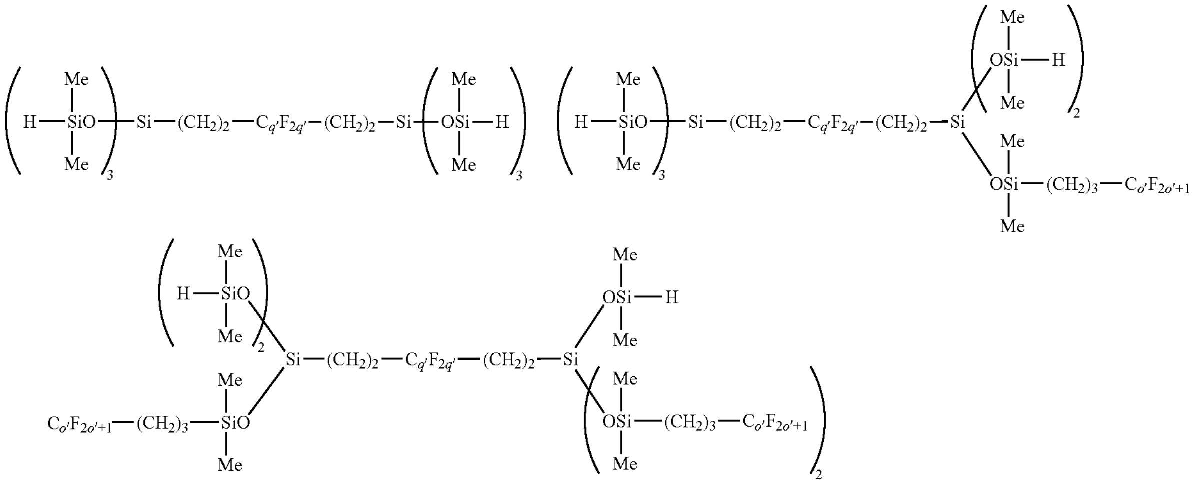
wherein o' is an integer of 1 to 10 and q' is an integer of 1 to 20.
[Chem. 30]
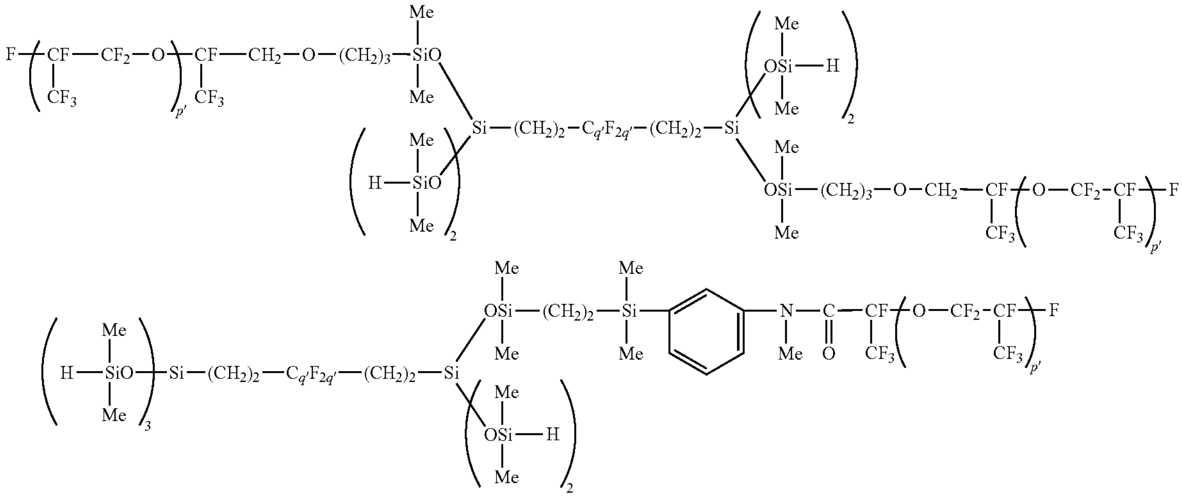
wherein p' is an integer of 1 to 50 and q' is an integer of 1 to 20.

[Chem. 31]

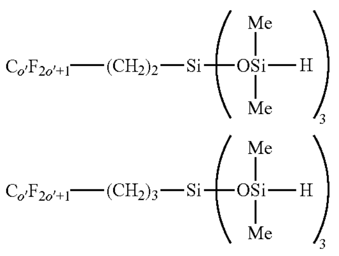

-continued

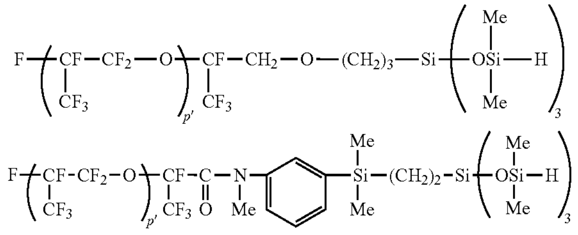

wherein o' is an integer of 1 to 10 and p' is an integer of 1 to 50.

[Chem. 32]

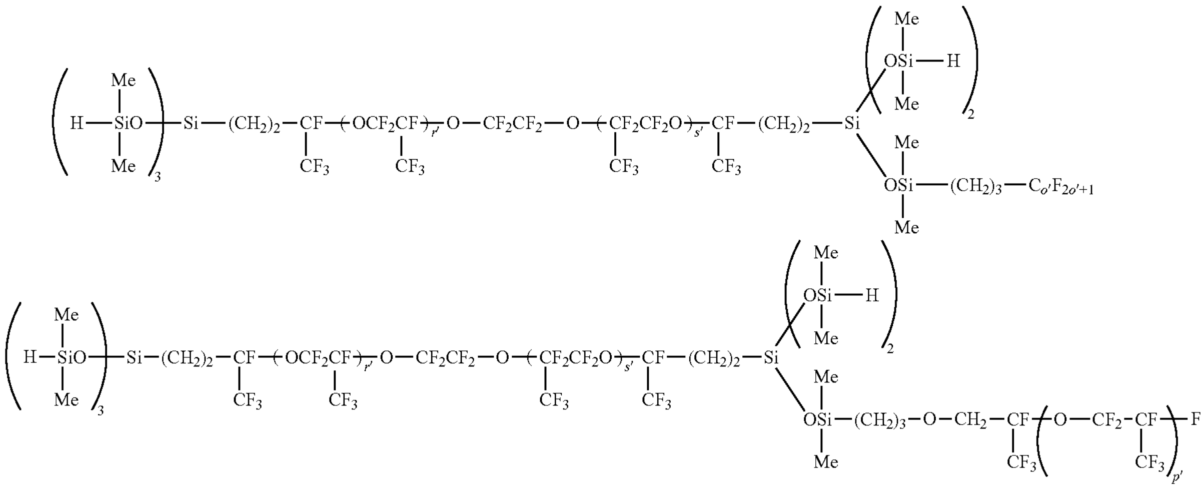

wherein o' is an integer of 1 to 10, p' is an integer of 1 to 50, r' and s' are each an integer of 1 to 100, and r'+s' is an integer of 2 to 200.

[Chem. 33]

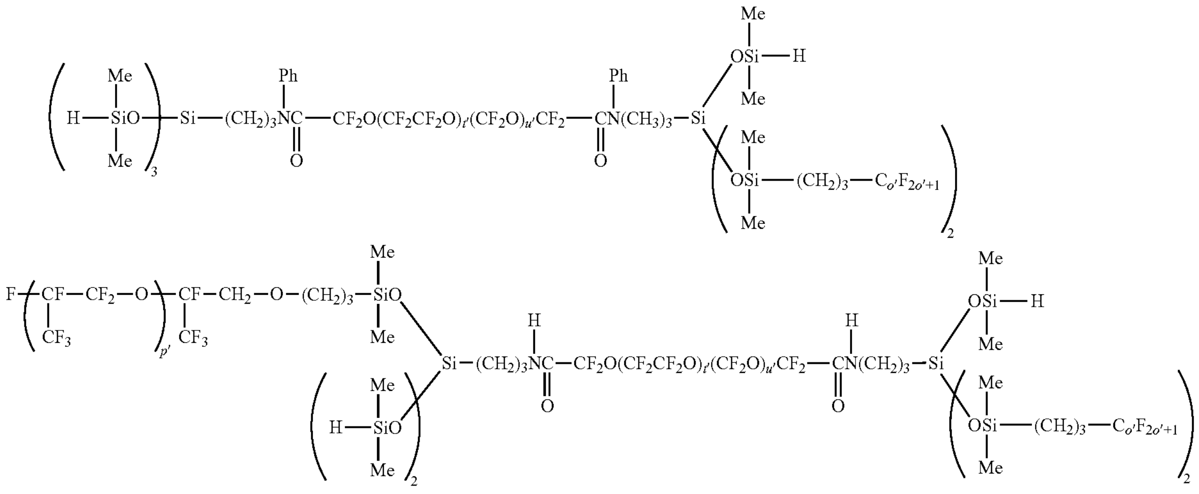

wherein o' is an integer of 1 to 10, p' is an integer of 1 to 50, t' and u' are each an integer of 1 to 50, and t'+u' is an integer of 2 to 100, and the repeating units shown in parentheses appended with t' and u' may be randomly arranged.

One kind of the component (B) may be used alone or two or more kinds thereof may be used in combination. In addition, the compounding amount of the component (B) is an amount (molar ratio) such that the amount of hydrogen atoms directly bonded to silicon atoms (SiH groups) in the component (B) is 0.5 to 3 mol, preferably 0.6 to 2 mol, based on 1 mol of alkenyl groups contained in the composition of the present invention. If the amount of the SiH group is less than 0.5 mol, the degree of crosslinking becomes insufficient, and on the other hand, if the amount is more than 3 mol, the storage stability is impaired, or the heat resistance of the cured product obtained after curing is deteriorated.

[Component (C)]

The platinum group metal-based catalyst as the component (C) is a hydrosilylation reaction catalyst. The hydrosilylation reaction catalyst is a catalyst that promotes an addition reaction between an alkenyl group contained in the composition, particularly an alkenyl group in the component (A) and SiH groups contained in the composition, particularly SiH groups in the component (B), and components (D), (E) and (G) described later. This hydrosilylation reaction catalyst is generally a noble metal or a compound thereof, and platinum or a platinum compound which is relatively easily available is often used because of its high price.

Examples of the platinum compound include chloroplatinic acid, a complex of chloroplatinic acid and an olefin such as ethylene, a complex of platinum and alcohol or vinylsiloxane, and metallic platinum supported on silica, alumina, carbon, and the like. As platinum or platinum group metal-based catalysts other than platinum compounds, rhodium, ruthenium, iridium, and palladium-based compounds are also known, and examples thereof include $RhCl(PPh_3)_3$, $RhCl(CO)(PPh_3)_2$, $Ru_3(CO)_{12}$, $IrCl(CO)(PPh_3)_2$, $Pd(PPh_3)_4$, and the like. In the formula, Ph is a phenyl group.

In the use of these catalysts, a catalyst can be used in a solid state when the catalyst is a solid catalyst, but in order to obtain a more uniform cured product, for example, it is preferable to use a catalyst obtained by dissolving chloroplatinic acid or a complex in an appropriate solvent such as toluene or ethanol, and compatibilizing the solution with the linear polyfluoro compound as the component (A).

The compounding amount of the component (C) is an effective amount as a hydrosilylation reaction catalyst, and is usually 0.1 to 2,000 ppm, preferably 0.1 to 500 ppm, and particularly preferably 0.5 to 200 ppm (in terms of the weight of platinum group metal atoms) with respect to the weight of the component (A), but can be appropriately increased or decreased according to a desired curing rate.

[Component (D)]

The component (D) is cyclic organopolysiloxane having, in one molecule, a hydrogen atom directly bonded to a silicon atom (SiH group), and an epoxy group or trialkoxysilyl group bonded to a silicon atom via a divalent hydrocarbon group which may contain an oxygen atom, or both groups, and free of fluorine in the molecule, and has a function as an adhesion-imparting agent that imparts self-adhesive property, particularly, good adhesive property to glass, without inhibiting light transmittance of a cured product obtained by curing the composition of the present invention.

The number of silicon atoms in the polysiloxane structure constituting the cyclic organopolysiloxane as the component (D) is not particularly limited, but is usually about 3 to 10, and preferably about 4 to 8.

Moreover, the component (D) has one or more SiH groups in one molecule, and the content of the SiH groups is preferably 0.0001 to 0.03 mol/g, more preferably 0.001 to 0.02 mol/g.

Examples of the epoxy group bonded to a silicon atom via a divalent hydrocarbon group which may contain an oxygen atom include alicyclic epoxy groups such as an epoxy group having the following general formula (18) and an epoxy cyclohexyl group having the following general formula (19):

[Chem. 34]

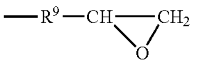

(18)

[Chem. 35]

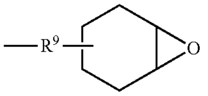

(19)

wherein $R^9$ is a divalent hydrocarbon group which may contain an oxygen atom.

In the general formulas (18) and (19), $R^9$ is a divalent hydrocarbon group which may have an oxygen atom intervened therebetween, having preferably 1 to 10 carbon atoms, more preferably 1 to 5 carbon atoms, and specific examples thereof include alkylene groups such as a methylene group, an ethylene group, a propylene group, a butylene group, a hexylene group and an octylene group, cycloalkylene groups such as a cyclohexylene group, and oxyalkylene groups such as an oxyethylene group, an oxypropylene group and an oxybutylene group, or the following groups (the left end is bonded to a silicon atom, and the right end is bonded to a carbon atom) in which a structure such as an ether-bonding oxygen atom or an ester bond is intervened in these groups, and the like.

$—CH_2CH_2CH_2OCH_2—$, $—CH_2CH_2CH_2—O—CO—$

Specific examples of the epoxy group via such a divalent hydrocarbon group which may contain an oxygen atom include those shown below:

[Chem. 36]

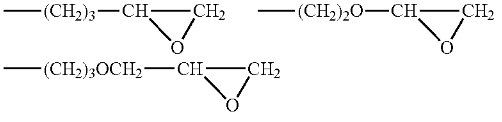

[Chem. 37]

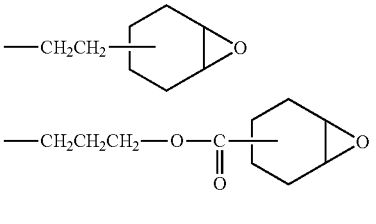

On the other hand, examples of the trialkoxysilyl group bonded to a silicon atom via a divalent hydrocarbon group which may contain an oxygen atom include those having the following general formula (20):

$$-R^{10}-Si(OR^{11})_3 \quad (20)$$

wherein $R^{10}$ is a divalent hydrocarbon group which may contain an oxygen atom, and $R^{11}$ is an alkyl group.

In the general formula (20), $R^{10}$ is preferably a divalent hydrocarbon group having 1 to 10 carbon atoms, more preferably 1 to 5 carbon atoms, and specific examples thereof include alkylene groups such as a methylene group, an ethylene group, a propylene group, a butylene group, a hexylene group, a cyclohexylene group, and an octylene group, and the like. In addition, $R^{11}$ is preferably an alkyl group having 1 to 8 carbon atoms, more preferably 1 to 4 carbon atoms, and specific examples thereof include a methyl group, an ethyl group, an n-propyl group, and the like.

Specific examples of such a trialkoxysilyl group via a divalent hydrocarbon group which may contain an oxygen atom include those shown below:

$$-(CH_2)_2-Si(OCH_3)_3,$$

$$-(CH_2)_3-Si(OCH_3)_3,$$

$$-(CH_2)_2-Si(OCH_2CH_3)_3,$$

$$-(CH_2)_3-Si(OCH_3CH_3)_3$$

Further, the monovalent substituent bonded to the silicon atom other than an epoxy group or a trialkoxysilyl group bonded to a silicon atom via a divalent hydrocarbon group which may contain an oxygen atom, described above, in the cyclic organopolysiloxane as the component (D) is an unsubstituted or substituted alkyl group or aryl group having 1 to 20, preferably 1 to 12 carbon atoms, and examples thereof include alkyl groups such as a methyl group, an ethyl group, a propyl group, a butyl group, a hexyl group, a cyclohexyl group, an octyl group, and a decyl group; aryl groups such as a phenyl group, a tolyl group, and a naphthyl group, and for example, a chloromethyl group, a chloropropyl group, and a cyanoethyl group in which some or all of hydrogen atoms of these groups are substituted with a halogen atom (excluding a fluorine atom) such as a chlorine atom, a cyano group, and the like. Among them, a methyl group is preferred.

The cyclic organopolysiloxane as the component (D) is preferably a cyclic organopolysiloxane having the following general formula (4):

[Chem. 38]

(4)

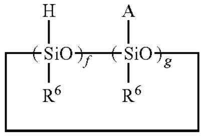

wherein f is an integer of 1 to 6, g is an integer of 1 to 4, and f+g is an integer of 4 to 10, $R^6$ is each independently an unsubstituted or substituted alkyl group or aryl group having 1 to 20 carbon atoms, and A is each independently an epoxy group or trialkoxysilyl group bonded to a silicon atom via a divalent hydrocarbon group which may contain an oxygen atom, provided that the order of bonding of $-(SiO)(H)R^6-$ and $-(SiO)(A)R^6-$ is not limited.

In the general formula (4), $R^6$ is each independently an unsubstituted or substituted alkyl group or aryl group having 1 to 20, preferably 1 to 12 carbon atoms, and examples thereof include alkyl groups such as a methyl group, an ethyl group, a propyl group, a butyl group, a hexyl group, a cyclohexyl group, an octyl group, and a decyl group; aryl groups such as a phenyl group, a tolyl group, and a naphthyl group, and for example, a chloromethyl group, a chloropropyl group, and a cyanoethyl group in which some or all of hydrogen atoms of these groups are substituted with a halogen atom (excluding a fluorine atom) such as a chlorine atom, a cyano group, and the like. Among them, a methyl group and an ethyl group are preferred.

In addition, A is each independently an epoxy group or trialkoxysilyl group bonded to a silicon atom via a divalent hydrocarbon group which may contain an oxygen atom, and examples thereof include groups having the formulas (18) to (20) described above.

Examples of the component (D) include the following compounds. Me represents a methyl group. In addition, the sequence of each divalent siloxane unit in the molecule can be either random, alternating, or block.

[Chem. 39]

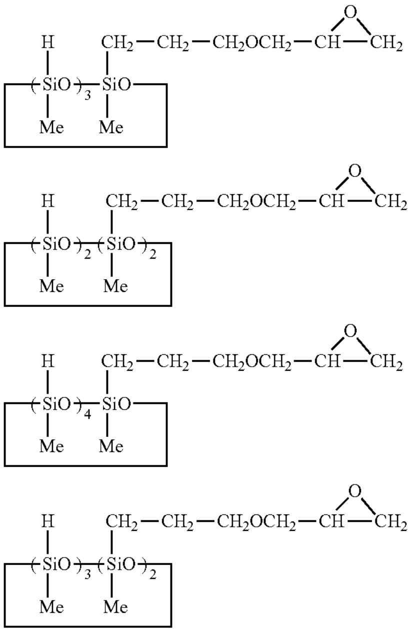

[Chem. 40]

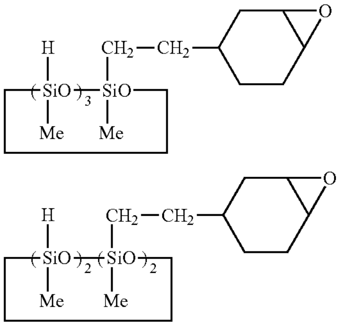

-continued

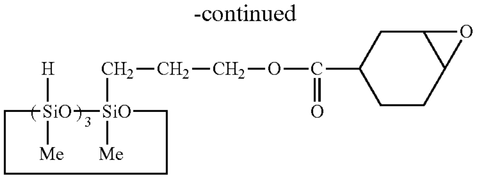

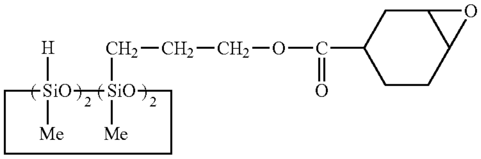

[Chem. 41]

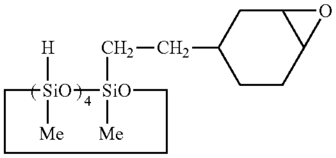

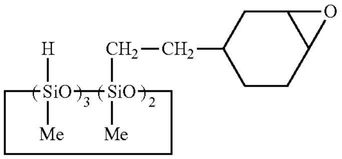

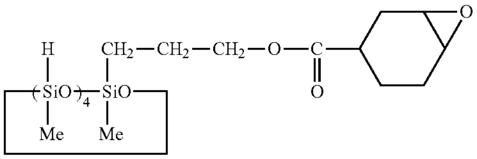

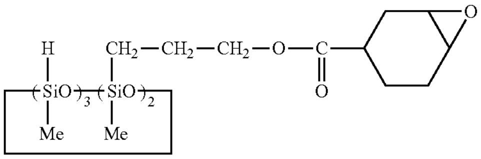

[Chem. 42]

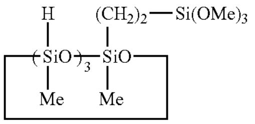

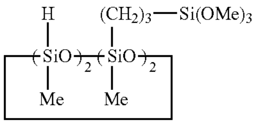

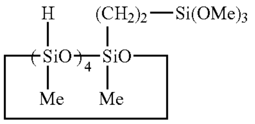

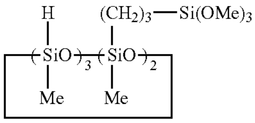

[Chem. 43]

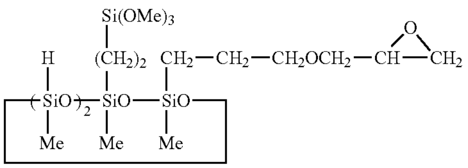

-continued

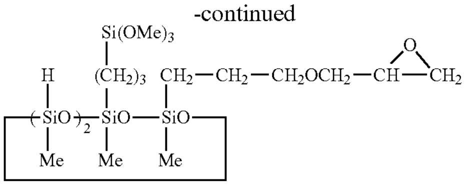

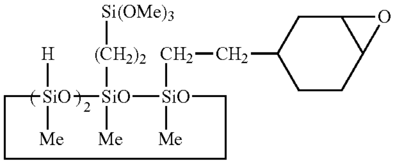

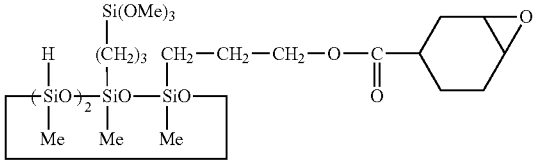

[Chem. 44]

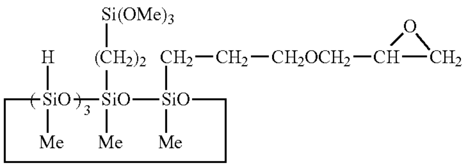

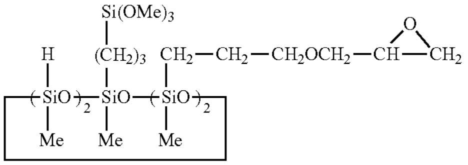

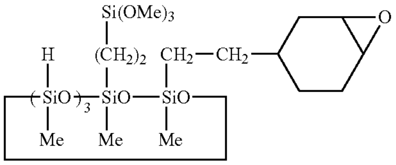

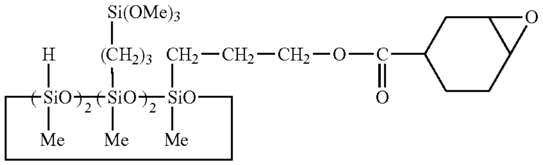

One kind of the component (D) may be used alone or two or more kinds thereof may be used in combination. In addition, the use amount of the component (D) is in a range of 0.01 to 5 parts by weight, preferably 0.02 to 3 parts by weight, and more preferably in a range of 0.03 to 2 parts by weight, per 100 parts by weight of the component (A). In the case of less than 0.01 parts by weight, sufficient adhesive property to glass cannot be obtained, and if the content exceeds 5 parts by weight, light transmittance of the cured product obtained by curing the composition of the present invention is deteriorated.

[Other Components]

To the curable fluoropolyether adhesive agent composition of the present invention (hereinafter also referred to as the adhesive agent composition), in addition to the components (A) to (D), other adhesion-imparting agent (component (E)), a hydrosilylation addition reaction controlling agent (component (F)), an inorganic filler, a plasticizer, a viscosity modifier, and a flexibility imparting agent as optional components can be added, in order to enhance its practicability. Further, various compounding agents such as an adhesion promoter such as carboxylic acid anhydride (component (G)) can be added as necessary, for the purpose of improving the adhesion imparting ability of the components (D) and (E) and promoting expression of self-adhesive property of the cured product obtained by curing the composition of the present invention. The compounding amount of these additives is arbitrary as long as the object of the present invention is not impaired unless otherwise described later.

[Component (E)]

The component (E) is a cyclic organopolysiloxane having, in one molecule, a hydrogen atom directly bonded to a silicon atom (SiH group), a monovalent perfluoroalkyl group or a monovalent perfluorooxyalkyl group, and an epoxy group or trialkoxysilyl group bonded to a silicon atom via a divalent hydrocarbon group which may contain an oxygen atom, or both groups, and has a function as other adhesion-imparting agent that improves light transmittance and further imparts self-adhesive property to the cured product obtained by curing the composition of the present invention.

The number of silicon atoms in the polysiloxane structure of the cyclic organopolysiloxane as the component (E) is not particularly limited, but is usually 3 to 10, and preferably 4 to 8.

Moreover, the component (E) has one or more SiH groups in one molecule, and the content of the SiH groups is preferably 0.00001 to 0.02 mol/g, more preferably 0.0001 to 0.01 mol/g.

The monovalent perfluoroalkyl group or the monovalent perfluorooxyalkyl group is a group introduced from the viewpoint of compatibility with the component (A), dispersibility, uniformity after curing, and the like. Examples of the monovalent perfluoroalkyl group or monovalent perfluorooxyalkyl group include groups having the general formula (6) or (7) described above.

In addition, the monovalent perfluoroalkyl group or the monovalent perfluorooxyalkyl group is preferably connected to a silicon atom constituting polysiloxane via a divalent hydrocarbon group (linking group) which may contain a silicon atom, an oxygen atom and a nitrogen atom, and as the divalent hydrocarbon group, an alkylene group, an arylene group and a combination thereof, or a group in which one or more kinds of structures selected from the group consisting of an ether-bonding oxygen atom, an amide bond, a carbonyl bond, an ester bond, and diorganosilylene groups such as a dimethylsilylene group are intervened in these groups or the like, and examples thereof include those having 2 to 20 carbon atoms such as $-CH_2CH_2-$, $-CH_2CH_2CH_2-$, $-CH_2CH_2CH_2OCH_2-$, $-CH_2CH_2CH_2-NH-CO-$, $-CH_2CH_2CH_2-N(Ph)-CO-$, $-CH_2CH_2CH_2-N(CH_3)-CO-$, $-CH_2CH_2CH_2-N(CH_2CH_3)-CO-$, $-CH_2CH_2CH_2-N(CH(CH_3)_2)-CO-$, $-CH_2CH_2CH_2-O-CO-$, $-CH_2CH_2-Si(CH_3)_2-O-Si(CH_3)_2-CH_2CH_2CH_2-$, $-CH_2CH_2-Si(CH_3)_2-O-Si(CH_3)_2-CH_2CH_2CH_2OCH_2-$, $-CH_2CH_2-Si(CH_3)_2-Ph'-N(CH_3)-CO-$, $-CH_2CH_2CH_2-Si(CH_3)_2-O-Si(CH_3)_2-CH_2CH_2-Si(CH_3)-Ph'-N(CH_3)-CO-$, $-CH_2-[Si(CH_3)_2-CH_2CH_2]_3-Ph'NH-CO-$, $[Si(CH_3)_2-CH_2CH_2]_3-Ph'-N(CH_3)-CO-$, provided that Ph is a phenyl group and Ph' is a phenylene group. In each of these groups, the left end is bonded to a silicon atom, and the right end is bonded to a carbon atom.

Examples of the epoxy group bonded to a silicon atom via a divalent hydrocarbon group which may contain an oxygen atom include alicyclic epoxy groups such as an epoxy group having the general formula (18) described above and an epoxy cyclohexyl group having the general formula (19).

On the other hand, examples of the trialkoxysilyl group bonded to a silicon atom via a divalent hydrocarbon group which may contain an oxygen atom include those having the general formula (20) described above.

Further, in the cyclic organopolysiloxane as the component (E), a monovalent substituent bonded to a silicon atom other than the hydrogen atom directly bonded to a silicon atom (SiH group), a monovalent perfluoroalkyl group or a monovalent perfluorooxyalkyl group, and an epoxy group or a trialkoxysilyl group bonded to a silicon atom via a divalent hydrocarbon group which may contain an oxygen atom are an unsubstituted or substituted alkyl group or aryl group having 1 to 20, preferably 1 to 12 carbon atoms, and examples thereof include alkyl groups such as a methyl group, an ethyl group, a propyl group, a butyl group, a hexyl group, a cyclohexyl group, an octyl group, and a decyl group; aryl groups such as a phenyl group, a tolyl group, and a naphthyl group, and for example, a chloromethyl group, a chloropropyl group, and a cyanoethyl group in which some or all of hydrogen atoms of these groups are substituted with a halogen atom such as a chlorine atom, a cyano group, and the like. Among them, a methyl group is preferred.

The cyclic organopolysiloxane as the component (E) is preferably a cyclic organopolysiloxane having the following general formula (5):

[Chem. 45]

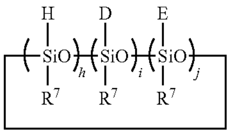

(5)

wherein h is an integer of 1 to 6, i is an integer of 1 to 4, j is an integer of 1 to 4, and h+i+j is an integer of 4 to 10. $R^7$ is each independently an unsubstituted or substituted alkyl group or aryl group having 1 to 20 carbon atoms, D is each independently a monovalent perfluoroalkyl group or a monovalent perfluorooxyalkyl group bonded to a silicon atom via a divalent hydrocarbon group which may contain a silicon atom, an oxygen atom and a nitrogen atom, and E is each independently an epoxy group or trialkoxysilyl group bonded to a silicon atom via a divalent hydrocarbon group which may contain an oxygen atom, provided that the order of bonding of —(SiO)(H)$R^7$—, —(SiO)(D)$R^7$—, and —(SiO)(E)$R^7$— is not limited.

In the general formula (5), $R^7$ is each independently an unsubstituted or substituted alkyl group or aryl group having 1 to 20, preferably 1 to 12 carbon atoms, and examples thereof include the hydrogen atom directly bonded to a silicon atom (SiH group), a monovalent perfluoroalkyl group or a monovalent perfluorooxyalkyl group, and the same groups as the groups exemplified as the monovalent substituent bonded to a silicon atom other than an epoxy group or a trialkoxysilyl group bonded to a silicon atom via a divalent hydrocarbon group which may contain an oxygen atom, and a methyl group is preferred.

In addition, D is each independently a monovalent perfluoroalkyl group or a monovalent perfluorooxyalkyl group bonded to a silicon atom via a divalent hydrocarbon group which may contain a silicon atom, an oxygen atom and a nitrogen atom, and examples of the monovalent perfluoroalkyl group or the monovalent perfluorooxyalkyl group include the groups having the general formula (6) or (7) described above, and examples of the divalent hydrocarbon group which may contain a silicon atom, an oxygen atom and a nitrogen atom include those exemplified as an alkylene group, an arylene group and a combination thereof, or a group in which one or more kinds of structures selected from the group consisting of an ether-bonding oxygen atom, an amide bond, a carbonyl bond, an ester bond, and diorganosilylene groups such as a dimethylsilylene group described above.

In addition, E is each independently an epoxy group or trialkoxysilyl group bonded to a silicon atom via a divalent hydrocarbon group which may contain an oxygen atom, and examples thereof include groups having the formulas (18) to (20) described above.

Examples of the component (E) include the following compounds. Me represents a methyl group. The sequence of each divalent siloxane unit in the molecule can be either random, alternating, or block.

[Chem. 46]

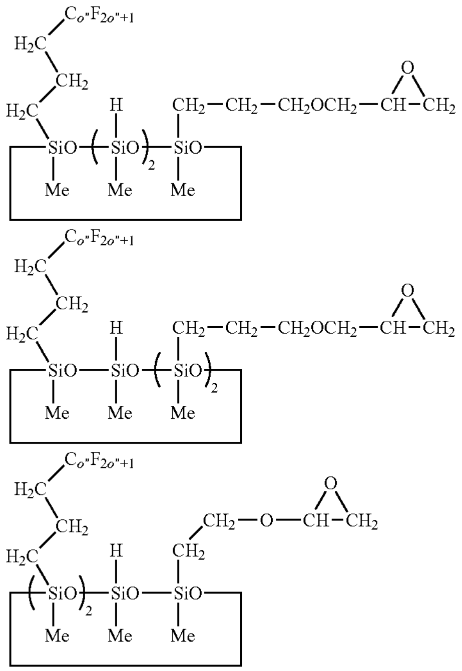

-continued

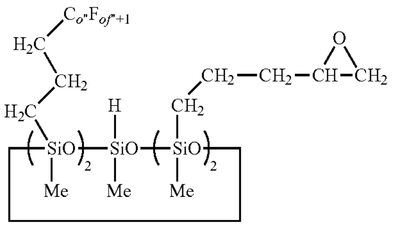

wherein o" is an integer of 1 to 10.

[Chem. 47]

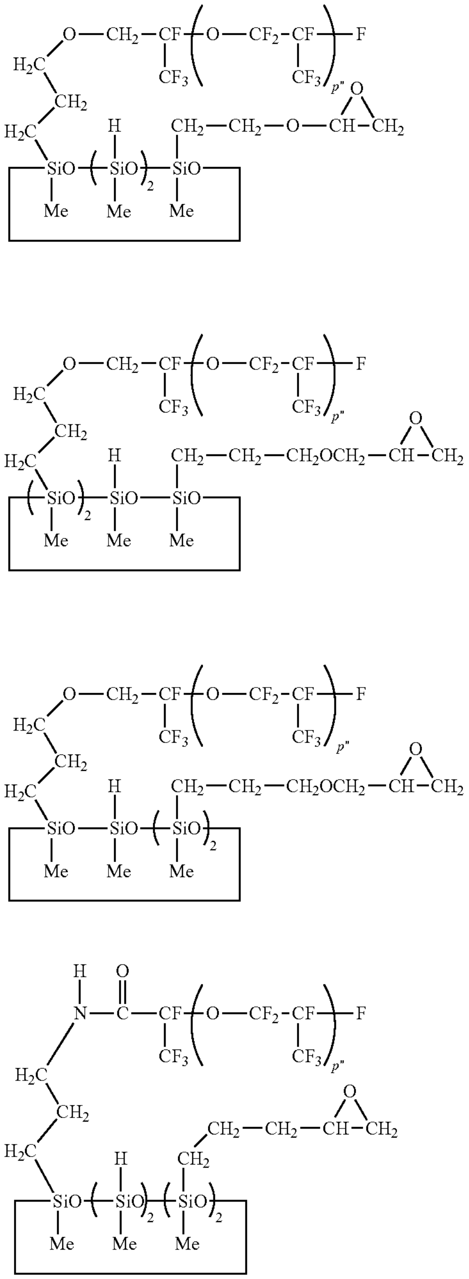

wherein p" is an integer of 1 to 50.

[Chem. 48]
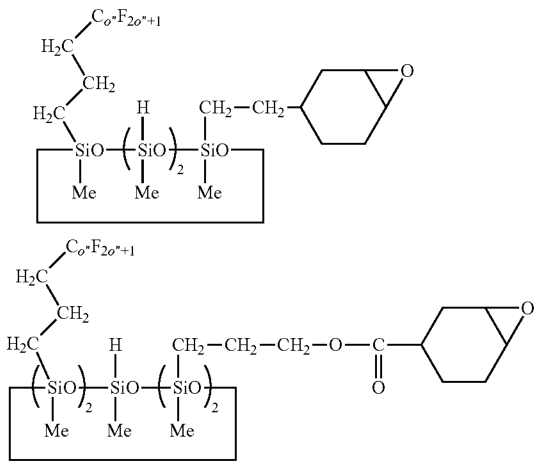
wherein o" is an integer of 1 to 10.
[Chem. 49]
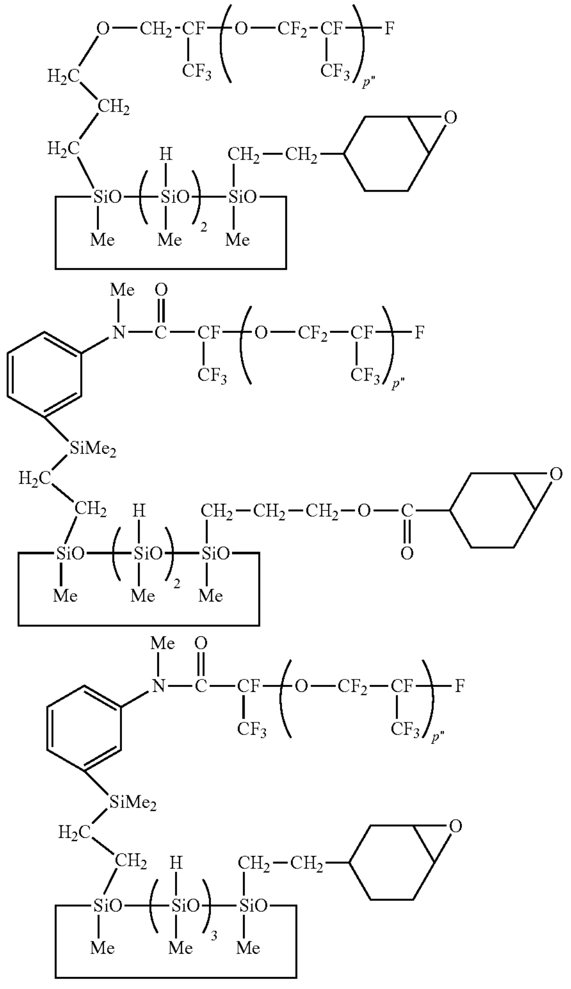
wherein p" is an integer of 1 to 50.
[Chem. 50]
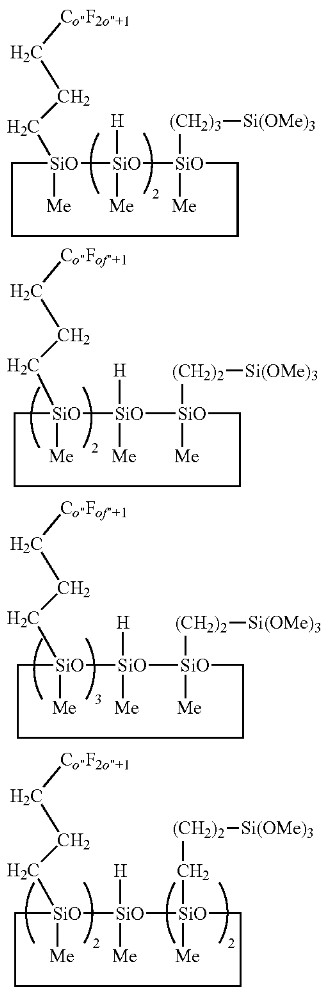
wherein o" is an integer of 1 to 10.
[Chem. 51]
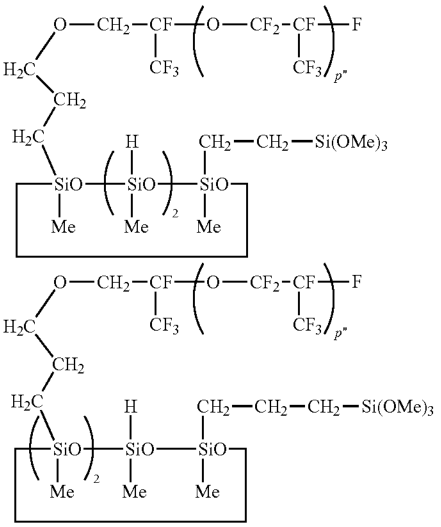

-continued

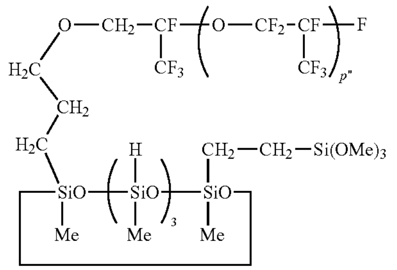

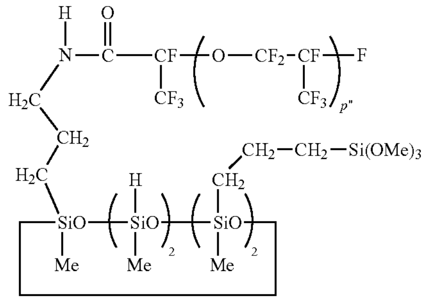

wherein p" is an integer of 1 to 50.

[Chem. 52]

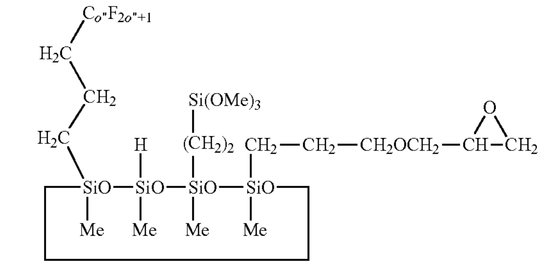

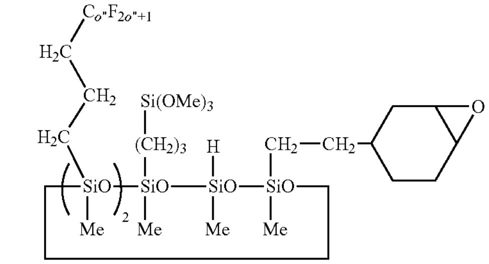

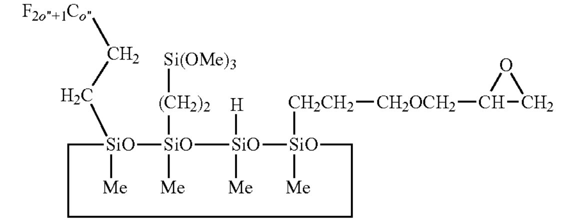

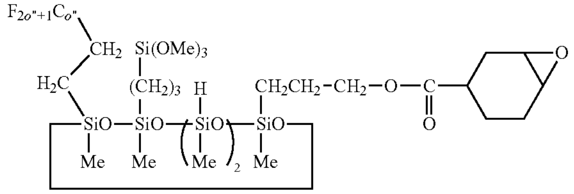

wherein o" is an integer of 1 to 10.

[Chem. 53]

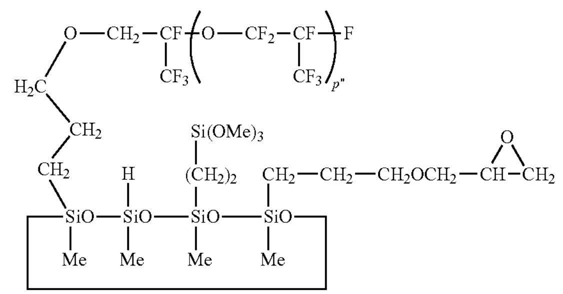

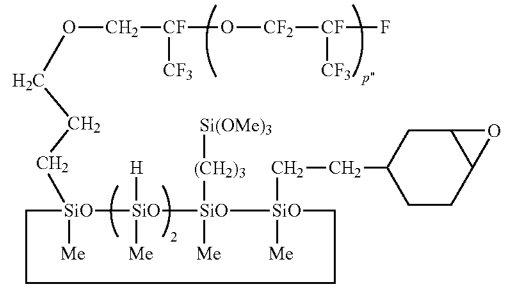

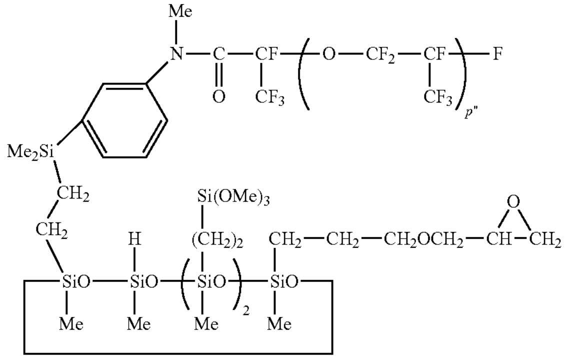

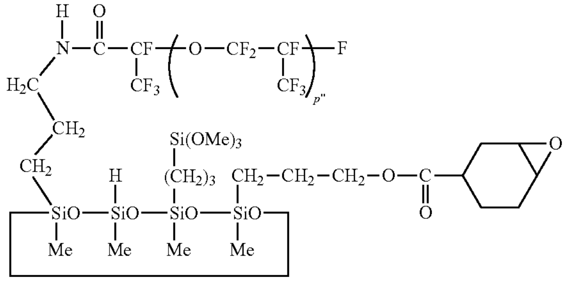

wherein p" is an integer of 1 to 50.

One kind of the component (E) may be used alone or two or more kinds thereof may be used in combination. In addition, the use amount of the component (E) when added is preferably in a range of 0.1 to 10 parts by weight, more preferably in a range of 0.1 to 7 parts by weight, and further preferably in a range of 0.5 to 5 parts by weight, per 100 parts by weight of the component (A). In the case of less than 0.1 parts by weight, further adhesive property improving effect may not be obtained, and if the content exceeds 10 parts by weight, the physical strength of the cured product obtained by curing the composition of the present invention may be deteriorated.

In the present invention, it is preferable that the component (E) is an amount (molar ratio) such that the total of hydrogen atoms directly bonded to silicon atoms (SiH groups) contained in the composition of the present invention (for example, the total of SiH groups contained in the component (B), the component (D) and the component (E), and component (G) described later) is 0.51 to 3.5 mol, particularly 0.6 to 2.5 mol, per 1 mol of the total of alkenyl groups contained in the composition of the present invention (for example, the total of alkenyl groups contained in the component (A) and the optional component described later).

Examples of the hydrosilylation addition reaction controlling agent (component (F)) include acetylenic alcohols such as 1-ethynyl-1-hydroxycyclohexane, 3-methyl-1-butin-3-ol, 3,5-dimethyl-1-hexin-3-ol, 3-methyl-1-penten-3-ol, and phenylbutinol; reaction products of chlorosilane having a monovalent perfluoroalkyl group having the general formula (6) or a monovalent perfluorooxyalkyl group having the general formula (7) and an acetylenic alcohol; 3-methyl-3-penten-1-yne, 3,5-dimethyl-3-hexen-1-yne; triallyl isocyanurate; polyvinylsiloxane; organophosphorus compounds; and the like, and the addition thereof can appropriately maintain curing reactivity and storage stability.

Examples of the inorganic filler include silica powders such as fumed silica (fumed silica or dry silica), precipitated silica (wet silica), spherical silica (fused silica), sol-gel method silica, and silica aerogel, or silica powders obtained by treating the surface of the silica powders with various organochlorosilanes, organodisilazanes, cyclic organopolysilazanes, or the like, silica based reinforcing fillers such as silica powders obtained by further retreating the surface-treated silica powders with organosilanes or organosiloxanes having a monovalent perfluoroalkyl group having the above general formula (6) or a monovalent perfluorooxyalkyl group having the above general formula (7), reinforcing or quasi-reinforcing fillers such as quartz powders, fused quartz powders, diatomaceous earth, and calcium carbonate, inorganic pigments such as titanium oxide, iron oxide, carbon black, and cobalt aluminate, heat resistance improvers such as titanium oxide, iron oxide, carbon black, cerium oxide, cerium hydroxide, zinc carbonate, magnesium carbonate, and manganese carbonate, thermal conductivity imparting agents such as alumina, boron nitride, silicon carbide, and metal powder, conductivity imparting agents such as carbon black, silver powder, and conductive zinc flower, and the like.

As the plasticizer, viscosity modifier, and flexibility imparting agent, a linear polyfluoro compound having the following general formula (21) or (22) and/or a polyfluoro monoalkenyl compound having the following general formula (23) can be used.

$$F—(CF_2CF_2CF_2O)_{\alpha}\text{-}L \quad (21)$$

wherein L is a group of $C_\beta F_{2\beta+1}$— (β is an integer of 1 to 3), and α is an integer of 1 to 500, preferably an integer of 2 to 300.

$$L\text{-}O—\{(CF(CF_3)CF_2O)_\gamma—(CF_2CF_2O)_\delta—(CF_2O)_\varepsilon\}\text{-}L \quad (22)$$

wherein L is the same as L described above, and γ and δ are each an integer of 0 to 300, preferably an integer of 0 to 150, provided that a case where both γ and δ are 0 is excluded, ε is an integer of 1 to 300, preferably an integer of 1 to 150, and the repeating units may be randomly arranged.

$$Rf\text{-}(M)_\zeta—CH{=}CH_2 \quad (23)$$

wherein Rf is a group having the following general formula (24):

$$F—[CF(CF_3)CF_2O]_\eta—C_\theta F_{2\theta}— \quad (24)$$

wherein η is an integer of 1 to 200, preferably an integer of 1 to 150, and θ is an integer of 1 to 3, M is —$CH_2$—, —$OCH_2$—, —$CH_2OCH_2$— or —CO—$NR^{12}$-Q-, in each of these groups, the left end is bonded to Rf and the right end is bonded to a carbon atom, $R^{12}$ is a hydrogen atom, a methyl group, a phenyl group or an allyl group, and Q is —$CH_2$—, a group having the following structural formula (25) or a group having the following structural formula (26):

[Chem. 54]

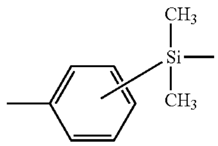

(25)

a dimethylphenylsilylene group shown by an ortho position, a meta position or a para position, and the left end is bonded to a nitrogen atom and the right end is bonded to a carbon atom,

[Chem. 55]

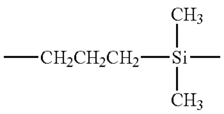

(26)

the left end is bonded to a nitrogen atom and the right end to a carbon atom, and ζ is 0 or 1.

Specific examples of the linear polyfluoro compound having the general formula (21) or (22) include the following:

$$F—(CF_2CF_2CF_2O)_{\alpha'}—CF_2CF_3$$

α' is an integer of 1 to 200, $$CF_3—O—\{(CF(CF_3)CF_2O)_{\gamma'}—(CF_2O)_{\varepsilon'}\}—CF_3$$

γ' is an integer of 1 to 200, ε' is an integer of 1 to 200, and the repeating units may be randomly arranged.

$$CF_3—O—\{(CF_2CF_2O)_{\delta'}—(CF_2O)_{\varepsilon'}\}—CF_3$$

δ' is an integer of 1 to 200, ε' is an integer of 1 to 200, and the repeating units may be randomly arranged.

One kind of the linear polyfluoro compound having the general formula (21) or (22) may be used alone or two or more kinds thereof may be used in combination.

Specific examples of the polyfluoromonoalkenyl compound having the general formula (23) include the following ones. Me represents a methyl group.

[Chem. 56]

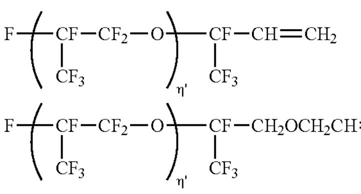

-continued

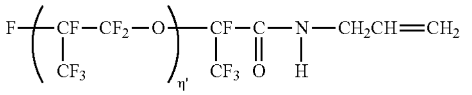

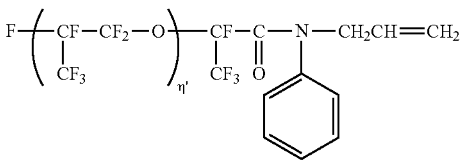

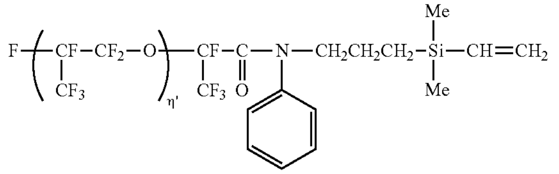

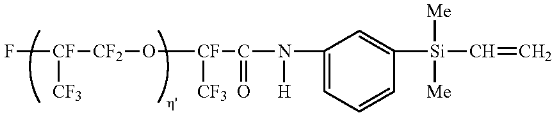

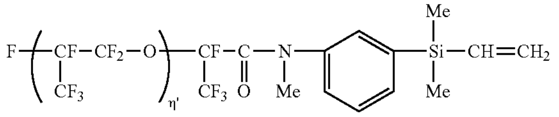

wherein η' is an integer of 1 to 200.

One kind of the polyfluoromonoalkenyl compound having the general formula (23) may be used alone or two or more kinds thereof may be used in combination.

As the carboxylic acid anhydride (component (G)), any one used as a curing agent for an epoxy resin can be used. Among them, from the viewpoint of compatibility with the adhesive agent composition of the present invention, those having a monovalent perfluoroalkyl group having the general formula (6) or a monovalent perfluorooxyalkyl group having the general formula (7) are preferable, and further, cyclic organopolysiloxanes other than the components (B) and (E) having a monovalent perfluoroalkyl group having the general formula (6) or a monovalent perfluorooxyalkyl group having the general formula (7), an SiH group, and a carboxylic acid anhydride group are preferable.

Here, in the cyclic organopolysiloxane as the component (G), the monovalent perfluoroalkyl group having the general formula (6) or the monovalent perfluorooxyalkyl group having the general formula (7) and the silicon atom constituting polysiloxane, and the carboxylic acid anhydride group and the silicon atom constituting polysiloxane, are preferably connected by a divalent linking group, respectively. The divalent linking group is preferably an unsubstituted or substituted divalent hydrocarbon group having 2 to 13 carbon atoms, particularly 2 to 8 carbon atoms, which may have an oxygen atom, a nitrogen atom, or a silicon atom. Specifically, alkylene groups, arylene groups, and combinations thereof, or groups in which one or more kinds of structures selected from the group consisting of an ether-bonding oxygen atom, an amide bond, a carbonyl bond, an ester bond, and diorganosilylene groups such as a dimethylsilylene group are intervened in these groups or the like can be exemplified, and examples thereof include those having 2 to 13 carbon atoms such as $-CH_2CH_2-$, $-CH_2CH_2CH_2-$, $-CH_2CH_2CH_2OCH_2-$, $-CH_2CH_2CH_2-NH-CO-$, $-CH_2CH_2CH_2-N(Ph)\text{-}CO-$, $-CH_2CH_2CH_2-N(CH_3)-CO-$, $-CH_2CH_2CH_2-N(CH_2CH_3)-CO-$, $-CH_2CH_2CH_2-N(CH(CH_3)_2)-CO-$, $-CH_2CH_2CH_2-O-CO-$, provided that Ph is a phenyl group. In each of these groups, the left end is bonded to a silicon atom, and the right end is bonded to a carbon atom.

Further, the monovalent substituent bonded to a silicon atom other than the monovalent perfluoroalkyl group having the general formula (6) or the monovalent perfluorooxyalkyl group having the general formula (7), the SiH group and the carboxylic acid anhydride group in the cyclic organopolysiloxane as the component (G) is an alkyl group or aryl group having 1 to 20, preferably 1 to 12 carbon atoms, and examples thereof include alkyl groups such as a methyl group, an ethyl group, a propyl group, a butyl group, a hexyl group, a cyclohexyl group, an octyl group and a decyl group; aryl groups such as a phenyl group, a tolyl group, and a naphthyl group; and the like. Among them, a methyl group is preferred.

The number of silicon atoms in the polysiloxane structure constituting the cyclic organopolysiloxane is not particularly limited, but is usually 3 to 10, and preferably 4 to 8.

It is preferable to have one to four monovalent perfluoroalkyl groups having the general formula (6) or the monovalent perfluorooxyalkyl groups having the general formula (7) in one molecule, and it is preferable to have one to four carboxylic acid anhydride groups in one molecule. Moreover, it is preferable to have one or more SiH groups in one molecule, and the content of the SiH groups is preferably 0.0001 to 0.02 mol/g, more preferably 0.001 to 0.01 mol/g.

Examples of the component (G) include the following one. Me represents a methyl group.

[Chem. 57]

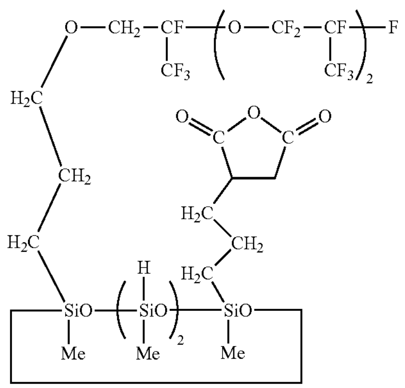

wherein the sequence of each divalent siloxane unit in the molecule can be random.

One kind of the component (G) may be used alone or two or more kinds thereof may be used in combination. In addition, the use amount of the component (G) when added is preferably in a range of 0.01 to 10 parts by weight, and more preferably in a range of 0.1 to 5 parts by weight, per 100 parts by weight of the component (A).

<Method for Producing Curable Fluoropolyether Adhesive Agent Composition>

The method for producing the adhesive agent composition of the present invention is not particularly limited, and the adhesive agent composition can be produced by kneading the components (A) to (D), the component (E), the component (F) and the component (G) as optional components, and other optional components. At this time, a mixing device such as a planetary mixer, a loss mixer or a Hobart mixer, or a kneading device such as a kneader or a three-roll mill can be used, as necessary.

Regarding the configuration of the adhesive agent composition of the present invention, the components (A) to (D), the component (E), the component (F) and the component (G) as optional components, and all other optional components may be handled as one composition, that is, may be configured as a so-called one-pack type, or may be configured as a two-pack type and both may be mixed at the time of use.

When the adhesive agent composition of the present invention is used, the composition may be dissolved at a desired concentration in an appropriate fluorine-based solvent, for example, 1,3-bis(trifluoromethyl)benzene, Fluorinert (manufactured by 3M), perfluorobutyl methyl ether, perfluorobutyl ethyl ether or the like depending on the use and purpose of the adhesive agent composition, and used. In particular, it is preferable to use a solvent in thin film coating applications.

<Method for Curing Curable Fluoropolyether Adhesive Agent Composition>

The transmittance to light of 500 nm wavelength of a cured product having a thickness of 2 mm obtained by curing the adhesive agent composition of the present invention is preferably 80% or more (80 to 100%), and more preferably 85 to 100%. In the case of a transmittance of less than 80%, a defect of an optical function may occur if the cured product is used for the optical component. Here, the transmittance is a transmittance to light of 500 nm wavelength, which is measured without using an integrating sphere, and is measured by an ultraviolet-visible-near infrared spectrophotometer (for example, UV-3600 manufactured by Shimadzu Corporation). The transmittance of 80% or more can be achieved by setting the compounding amount of cyclic organopolysiloxane as the component (D) per 100 parts by weight of the alkenyl group-containing linear polyfluoro compound as the component (A) in an adhesive agent composition having a specific composition containing the components (A) to (D) of the present invention to be within a specific range (that is, 0.01 to 5 parts by weight, preferably 0.02 to 3 parts by weight, and more preferably 0.03 to 2 parts by weight) defined in the present invention.

The adhesive agent composition of the present invention can be easily cured by being left at normal temperature (20° C.±15° C.) or by being heated. In this case, it is preferable to perform thermal curing usually within a range of normal temperature (for example, 5 to 35° C.) to 200° C., and 1 minute to 24 hours.

<Optical Component>

A cured product obtained by curing the adhesive agent composition of the present invention (fluoropolyether rubber elastic body) is excellent in heat resistance, oil resistance, chemical resistance, solvent resistance, low temperature characteristics, low moisture permeability and the like, further has good light transmittance and good adhesive property to various substrates, especially glass, and thus is suitable as an adhesive material used for an optical component, especially, an optical component containing glass as a constituent material. Specific examples thereof include optical materials used for display substrates such as light guide plates, backlights, liquid crystal display elements, color filters and EL display element substrates, surface protective films, light diffusion films, retardation films, transparent conductive films, antireflection films, OHP films, optical disks, optical fibers, lenses, and the like, sealing materials for protecting electrical and electronic components such as optical semiconductor elements such as rectifying diodes, light emitting diodes, LSIs, and organic ELs, surface layer materials of fixing members in an image forming apparatus equipped with a light reflection sensor, and the like. The glass referred to herein is, for example, glass selected from soda lime glass, alkali aluminosilicate glass, borosilicate glass, quartz glass, fluoride glass, chalcogenide glass, multicomponent glass, chemically strengthened glass, and the like.

EXAMPLES

Hereinafter, the present invention is described specifically with reference to Examples and Comparative Examples, but the present invention is not limited to the following Examples. In the following Examples, parts represent parts by weight, and Me represents a methyl group. The polymerization degree of the components (A), (B), (E), and (G) is a numerical average polymerization degree calculated from $^{19}F$-NMR, and the viscosity of the component (A) shows a measured value at 23° C. (in accordance with JIS K6249).

Examples 1 to 9, Comparative Examples 1 to 4

The components (A) to (G) used in the following Examples and Comparative Examples are shown below. The vinyl group content of the component (A) is calculated from $^{1}H$-NMR using an internal standard substance, and the SiH group content of the components (B), (D), (E), and (G) is calculated from an average molecular formula. In addition, in the following formula, the sequence of each divalent siloxane unit in the molecule is random, alternating, or block.

Component (A)

(A-1): Linear polyfluoro compound having the following formula (27)

(viscosity: 4,010 mPa·s, vinyl group content: 0.0301 mol/100 g)

[Chem. 58]

(27)

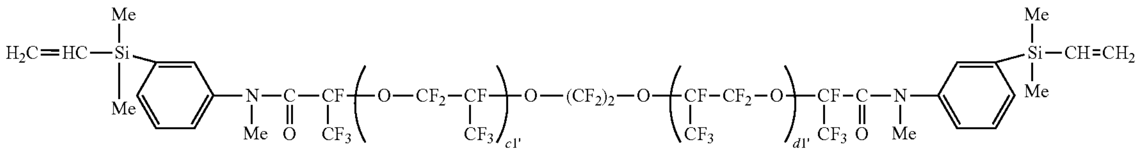

provided that c1' and d1' are integers of 1 or more, and the average value of c1'+d1' is 35.

(A-2): Linear polyfluoro compound having the following formula (28)

(viscosity: 11,000 mPa·s, vinyl group content: 0.0119 mol/100 g)

[Chem. 59]

(28)

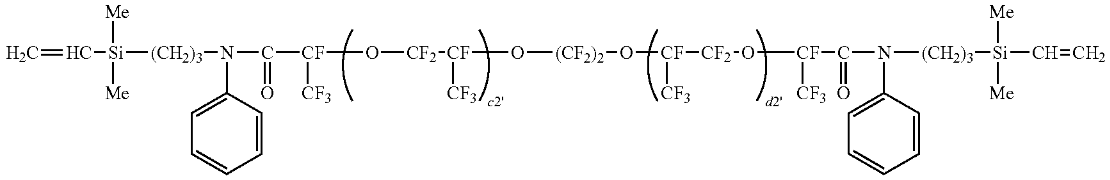

provided that c2' and d2' are integers of 1 or more, and the average value of c2'+d2' is 90.

Component (B)

(B-1): Fluorine-containing organohydrogensiloxane having the following formula (29)

(SiH group content: 0.00394 mol/g)

[Chem. 60]

(29)

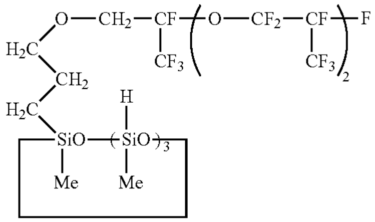

(B-2): Fluorine-containing organohydrogensiloxane having the following formula (30)

(SiH group content: 0.000967 mol/g)

[Chem. 61]

(30)

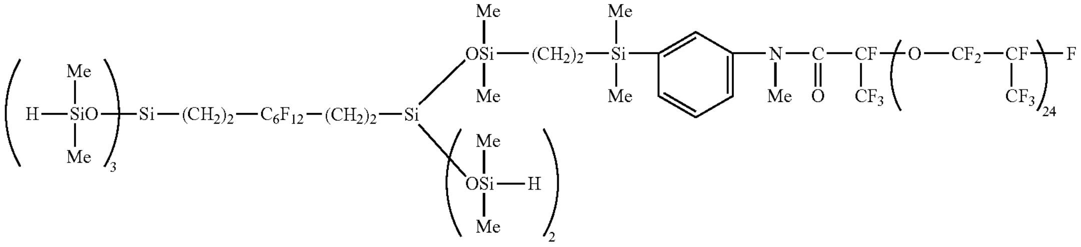

Component (C)

(C-1): Toluene solution of platinum-divinyltetramethyldisiloxane complex (platinum concentration: 0.5 wt %)

Component (D)

(D-1): Cyclic organopolysiloxane having the following formula (31)

(SiH group content: 0.00846 mol/g)

[Chem. 62]

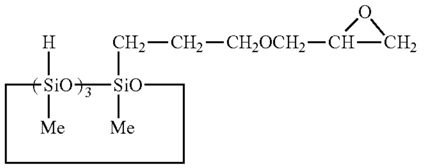

(31)

(D-2): Cyclic organopolysiloxane having the following formula (32)

(SiH group content: 0.00823 mol/g)

[Chem. 63]

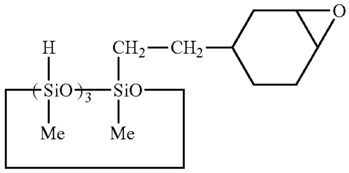

(32)

(D-3): Cyclic organopolysiloxane having the following formula (33)

(SiH group content: 0.00280 mol/g)

[Chem. 64]

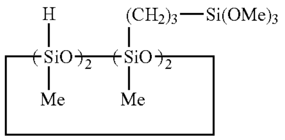

(33)

(D-4): Cyclic organopolysiloxane having the following formula (34)

(SiH group content: 0.00338 mol/g)

[Chem. 65]

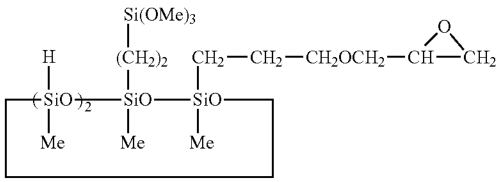

(34)

(D-5): Cyclic organopolysiloxane having the following formula (35)

(SiH group content: 0.00333 mol/g)

[Chem. 66]

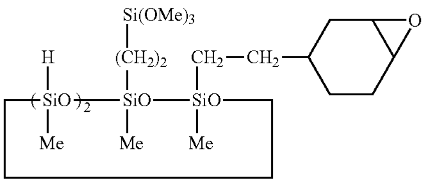

(35)

Component (E)

(E-1): Organopolysiloxane having the following formula (36)

(SiH group content: 0.00101 mol/g)

[Chem. 67]

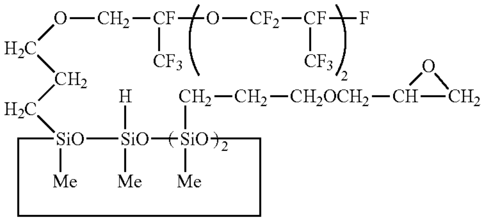

(36)

(E-2): Organopolysiloxane having the following formula (37)

(SiH group content: 0.00226 mol/g)

[Chem. 68]

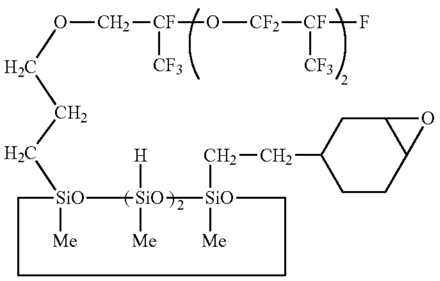

(37)

(E-3): Organopolysiloxane having the following formula (38)

(SiH group content: 0.00116 mol/g)

[Chem. 69]

(38)

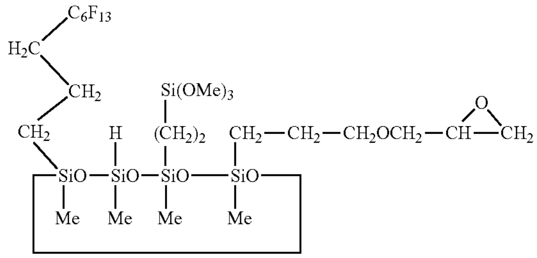

Component (F)

(F-1): 50 wt % Toluene solution of 1-ethynyl-1-hydroxy-cyclohexane

Component (G)

(G-1): Carboxylic acid anhydride having the following formula (39)

(SiH group content: 0.00222 mol/g)

[Chem. 70]

(39)

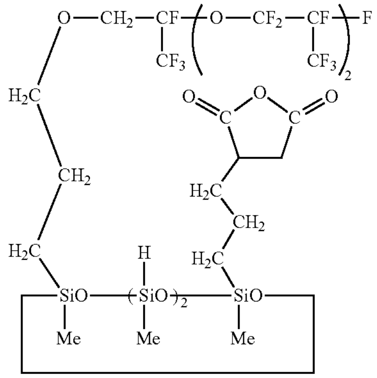

In Examples 1 to 9 and Comparative Examples 1 to 4, compositions were prepared as follows using predetermined amounts of the components shown in Table 1. In addition, according to the following method, the composition was molded and cured to prepare a cured product, the transmittance to light of 500 nm wavelength of the cured product was measured, and a test of tensile shear adhesion to glass was further performed. The results are shown in Table 1.

Preparation of Compositions of Examples 1 to 9:

First, the component (A) and the component (C) were kneaded in predetermined amounts shown in Table 1 at room temperature (25° C.) for 10 minutes using a planetary mixer. Next, a predetermined amount of the component (F) shown in Table 1 was added to the kneaded product, and the mixture was kneaded at room temperature for 10 minutes. Finally, predetermined amounts of the component (B) and the component (D), further, the component (E) and the component (G) as necessary, shown in Table 1 were added thereto, and the mixture was kneaded at room temperature for 10 minutes to obtain compositions.

Preparation of Compositions of Comparative Examples 1 to 4:

First, the component (A) and the component (C) were kneaded in predetermined amounts shown in Table 1 at room temperature for 10 minutes using a planetary mixer. Next, predetermined amounts of the component (F) shown in Table 1 were added to the kneaded product, and the mixture was kneaded at room temperature for 10 minutes. Then, finally, predetermined amounts of the components (B) and (E), further, the component (G) as necessary, shown in Table 1 were added thereto, and the mixture was kneaded at room temperature for 10 minutes to obtain compositions.

Preparation of Cured Products of Examples 1 to 9 and Comparative Examples 1 to 4:

The compositions were subjected to press crosslinking (primary crosslinking) at 150° C. for 10 minutes and oven crosslinking (secondary crosslinking) at 150° C. for 50 minutes to prepare cured sheets (85 mm×105 mm×2 mm).

Transmittance to Light of 500 nm Wavelength of Cured Products of Examples 1 to 9 and Comparative Examples 1 to 4:

Using the cured sheet, the transmittance to light of 500 nm wavelength was measured with an ultraviolet-visible-near infrared spectrophotometer UV-3600 (manufactured by Shimadzu Corporation). The results are shown in Table 1.

Tensile Shear Adhesive Strength to Glass of Examples 1 to 9 and Comparative Examples 1 to 4:

Two sheets of float glass (soda lime glass produced by a float method) of 150 mm×25 mm×thickness 5 mm were superposed with a layer of the composition of each of Examples and Comparative Examples (length 10 mm×width 25 mm×thickness 80 μm) having a thickness of 80 μm sandwiched therebetween such that the respective ends overlapped each other by 10 mm, and the compositions were cured by heating at 150° C. for 1 hour to prepare adhesion test pieces. Next, the test pieces were subjected to a tensile shear adhesion test (tension rate: 50 mm/min) to evaluate the adhesion strength (shear adhesion) and the cohesive failure rate. The results are shown in Table 1.

TABLE 1

| | | | Example | | | | | |
|---|---|---|---|---|---|---|---|---|
| | | | 1 | 2 | 3 | 4 | 5 | 6 |
| Composition (pbw) | (A) | (A-1) | 100 | 100 | — | 100 | — | 100 |
| | | (A-2) | — | — | 100 | — | 100 | — |
| | (B) | (B-1) | 8.40 | 8.40 | 3.62 | — | — | — |
| | | (B-2) | — | — | — | 34.2 | 12.9 | 34.2 |
| | (C) | (C-1) | 0.20 | 0.20 | 0.20 | 0.05 | 0.05 | 0.05 |
| | (D) | (D-1) | 0.20 | — | — | — | — | — |
| | | (D-2) | — | 0.08 | — | — | — | — |
| | | (D-3) | — | — | 1.0 | — | — | — |
| | | (D-4) | — | — | — | 0.10 | — | 0.10 |
| | | (D-5) | — | — | — | — | 0.20 | — |
| | (E) | (E-1) | — | — | — | — | — | 2.0 |
| | | (E-2) | — | — | — | — | — | — |

TABLE 1-continued

| | | | | | | | | |
|---|---|---|---|---|---|---|---|---|
| | | (E-3) | — | — | — | — | — | — |
| | (F) | (F-1) | 0.20 | 0.20 | 0.20 | 0.20 | 0.20 | 0.20 |
| | (G) | (G-1) | — | — | — | — | — | — |
| SiH group (Component (B))/ Vi group (Component (A)) (molar ratio) | | | 1.1 | 1.1 | 1.2 | 1.1 | 1.05 | 1.1 |
| Evaluation results | Light transmittance (% @500 nm) | | 87 | 88 | 85 | 90 | 91 | 93 |
| | Test of tensile shear adhesion to glass | Adhesion strength (MPa) | 1.5 | 1.4 | 1.8 | 1.7 | 1.4 | 1.5 |
| | | Cohesive failure rate (area %) | 100 | 90 | 100 | 100 | 90 | 100 |

| | | | Example | | | Comparative Example | | | |
|---|---|---|---|---|---|---|---|---|---|
| | | | 7 | 8 | 9 | 1 | 2 | 3 | 4 |
| Composition (pbw) | (A) | (A-1) | 100 | — | 100 | 100 | 100 | — | 100 |
| | | (A-2) | — | 100 | — | — | — | 100 | — |
| | (B) | (B-1) | 8.40 | — | 8.40 | — | 8.40 | — | — |
| | | (B-2) | — | 12.9 | | 34.2 | — | 12.9 | 34.2 |
| | (C) | (C-1) | 0.20 | 0.05 | 0.20 | 0.05 | 0.20 | 0.05 | 0.05 |
| | (D) | (D-1) | — | — | — | — | — | — | — |
| | | (D-2) | 0.08 | — | 0.08 | — | — | — | — |
| | | (D-3) | — | — | — | — | — | — | — |
| | | (D-4) | — | — | — | — | — | — | — |
| | | (D-5) | — | 0.20 | — | — | — | — | — |
| | (E) | (E-1) | — | — | — | 2.0 | — | — | 2.0 |
| | | (E-2) | 1.0 | — | 1.0 | — | 1.0 | — | — |
| | | (E-3) | — | 2.5 | — | — | — | 2.5 | — |
| | (F) | (F-1) | 0.20 | 0.20 | 0.20 | 0.20 | 0.20 | 0.20 | 0.20 |
| | (G) | (G-1) | — | — | 0.50 | — | — | — | 0.50 |
| SiH group (Component (B))/ Vi group (Component (A)) (molar ratio) | | | 1.1 | 1.05 | 1.1 | 1.1 | 1.1 | 1.05 | 1.1 |
| Evaluation results | Light transmittance (% @500 nm) | | 91 | 94 | 93 | 94 | 93 | 95 | 95 |
| | Test of tensile shear adhesion to glass | Adhesion strength (MPa) | 1.2 | 1.3 | 1.5 | 0.4 | 0.4 | 0.5 | 0.6 |
| | | Cohesive failure rate | 90 | 100 | 100 | 10 | 10 | 10 | 20 |

The cured products obtained by curing the compositions of Examples 1 to 9 that satisfied the requirements of the present invention showed not so low transmittance to light of 500 nm wavelength as compared with the cured product obtained by curing the compositions of Comparative Examples 1 to 4 free of the component (D), and exhibited good adhesive property to glass.

From the above results, the adhesive agent composition of the present invention is useful as an adhesive material of an optical component, especially, an optical component containing glass as a constituent material because it gives a cured product having good light transmittance and good adhesive property to glass.

The invention claimed is:

1. An optical component comprising a cured product of a curable fluoropolyether adhesive agent composition, wherein the curable fluoropolyether adhesive agent composition comprises:

(A) 100 parts by weight of a linear polyfluoro compound having two or more alkenyl groups in one molecule and having a perfluoropolyether structure in a main chain, (B) a fluorine-containing organohydrogensiloxane having, in one molecule, a monovalent perfluoroalkyl group or a monovalent perfluorooxyalkyl group, or having a divalent perfluoroalkylene group or a divalent perfluorooxyalkylene group, and further having two or more hydrogen atoms directly bonded to silicon atoms (SiH groups), and free of an epoxy group and an alkoxy group directly bonded to a silicon atom in the molecule, (C) 0.1 to 2,000 ppm in terms of the weight of platinum group metal atoms with respect to the component (A) of a platinum group metal-based catalyst, and (D) 0.01 parts by weight or more and less than 1 parts by weight of a cyclic organopolysiloxane having, in one molecule, a hydrogen atom directly bonded to a silicon atom (SiH group), and an epoxy group or trialkoxysilyl group bonded to a silicon atom via a divalent hydrocarbon group which may contain an oxygen atom, or both groups, and free of fluorine in the molecule, wherein the compounding amount of the component (B) is an amount such that the amount of hydrogen atoms directly bonded to silicon atoms in the component (B)

is 0.5 to 3 mol, based on 1 mol of alkenyl groups contained in the composition, and the transmittance to light of 500 nm wavelength of the cured product having a thickness of 2 mm obtained by curing the composition is more than 85%, and the component (A) is a linear polyfluoro compound having the following general formula (3):

(3)

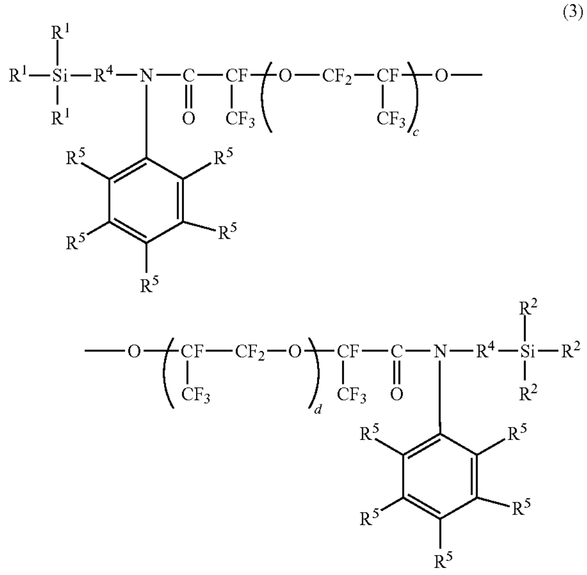

wherein $R^1$ and $R^2$ are alkenyl groups or monovalent hydrocarbon groups free of unsubstituted or substituted aliphatic unsaturated bond, $R^1$ is independent of each other, $R^2$ is also independent of each other, 2 or more of a total of 6 of $R^1$ and $R^2$ are an alkenyl group, $R^4$ is each independently an alkylene group having 1 to 6 carbon atoms, $R^5$ is each independently a hydrogen atom or an alkyl group having 1 to 4 carbon atoms which may be substituted with fluorine, c and d are each an integer of 1 to 150, the average value of c+d is 2 to 300, and e is an integer of 1 to 6.

2. The optical component according to claim 1, wherein in the curable fluoropolyether adhesive agent composition, the alkenyl group content of the linear polyfluoro compound as the component (A) is 0.005 to 0.3 mol/100 g.

3. The optical component according to claim 1, wherein the component (D) is a cyclic organopolysiloxane having the following general formula (4):

(4)

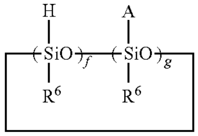

wherein f is an integer of 1 to 6, g is an integer of 1 to 4, and f+g is an integer of 4 to 10, $R^6$ is each independently an unsubstituted or substituted alkyl group or aryl group having 1 to 20 carbon atoms, and A is each independently an epoxy group or trialkoxysilyl group bonded to a silicon atom via a divalent hydrocarbon group which may contain an oxygen atom, provided that the order of bonding of —(SiO)(H)$R^6$— and —(SiO)(A)$R^6$— is not limited.

4. The optical component according to claim 1, wherein the curable fluoropolyether adhesive agent composition further comprises:

0.1 to 10 parts by weight of (E) a cyclic organopolysiloxane having, in one molecule, a hydrogen atom directly bonded to a silicon atom (SiH group), a monovalent perfluoroalkyl group or a monovalent perfluorooxyalkyl group, and an epoxy group or trialkoxysilyl group bonded to a silicon atom via a divalent hydrocarbon group which may contain an oxygen atom, or both groups, per 100 parts by weight of the component (A).

5. The optical component according to claim 4, wherein the component (E) is a cyclic organopolysiloxane having the following general formula (5):

(5)

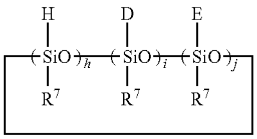

wherein h is an integer of 1 to 6, i is an integer of 1 to 4, j is an integer of 1 to 4, and h+i+j is an integer of 4 to 10, $R^7$ is each independently an unsubstituted or substituted alkyl group or aryl group having 1 to 20 carbon atoms, D is each independently a monovalent perfluoroalkyl group or a monovalent perfluorooxyalkyl group bonded to a silicon atom via a divalent hydrocarbon group which may contain a silicon atom, an oxygen atom and a nitrogen atom, and E is each independently an epoxy group or trialkoxysilyl group bonded to a silicon atom via a divalent hydrocarbon group which may contain an oxygen atom, provided that the order of bonding of —(SiO)(H)$R^7$—, —(SiO)(D)$R^7$— and —(SiO)(E)$R^7$— is not limited.

6. The optical component according to claim 1, wherein the cured product of the curable fluoropolyether adhesive agent composition is attached to a glass adherend.

7. The optical component according to claim 1, further comprising glass as a constituent material.

8. The optical component according to claim 1, wherein the component (B) is at least one selected from the fluorine-containing organohydrogensiloxane having the following general formulas (13) to (17):

(13)

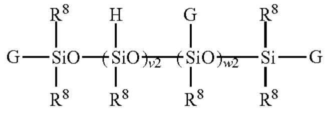

wherein G is each independently a monovalent perfluoroalkyl group or monovalent perfluorooxyalkyl group bonded to a silicon atom constituting siloxane via an unsubstituted or substituted divalent hydrocarbon group having 2 to 13 carbon atoms, $R^8$ is each independently an unsubstituted or substituted alkyl group or aryl group having 1 to 20 carbon atoms, and v2 is an integer of 2 to 50, w2 is an integer of 1 to 40, and v2+w2 is an integer of 4 to 60, provided that the order of bonding of —(Si(H)($R^8$)O)— and —(Si(G)($R^8$)O)— is not limited, (14)

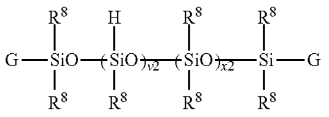

wherein G is each independently the same as G above, $R^8$ is each independently the same as $R^8$ above, and v2 is an integer of 2 to 50, x2 is an integer of 1 to 40, and v2+x2 is an integer of 4 to 60, provided that the order of bonding of —(Si(H)($R^8$)O)— and —(Si($R^8$)$_2$O)— is not limited, (15)

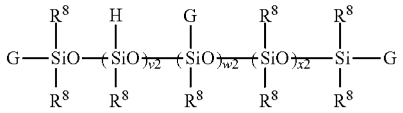

wherein G is each independently the same as G above, $R^8$ is each independently the same as $R^8$ above, and v2 is an integer of 2 to 50, w2 is an integer of 1 to 40, x2 is an integer of 1 to 40, and v2+w2+x2 is an integer of 5 to 60, provided that the order of bonding of —(Si(H)($R^8$)O)—, —(Si(G)($R^8$)O)— and —(Si($R^8$)$_2$O)— is not limited, (16)

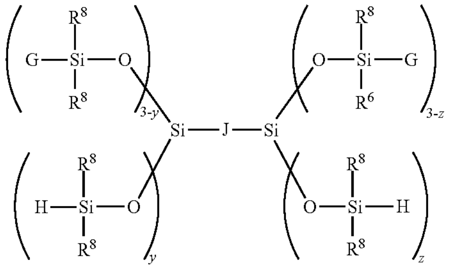

wherein J is an oxygen atom, an alkylene group, or a divalent perfluoroalkylene group or divalent perfluorooxyalkylene group each bonded to an adjacent silicon atom via a divalent hydrocarbon group which may have an oxygen atom or a nitrogen atom, G is each independently the same as G above, $R^8$ is each independently the same as $R^8$ above, and y is an integer of 0 to 3, z is an integer of 0 to 3, and y+z is an integer of 2 to 6, provided that, when J is an oxygen atom or an alkylene group, y+z is an integer of 2 to 5, and (17)

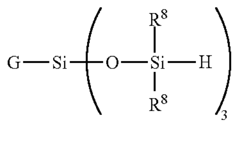

wherein G is the same as G above, and $R^8$ is each independently the same as $R^8$ above.

9. The optical component according to claim 1, wherein in the curable fluoropolyether adhesive agent composition, the compounding amount of component (D) is 0.01 to 0.2 parts by weight per 100 parts by weight of component (A).

10. An optical component comprising a cured product of a curable fluoropolyether adhesive agent composition, wherein the curable fluoropolyether adhesive agent composition comprises:

(A) 100 parts by weight of a linear polyfluoro compound having two or more alkenyl groups in one molecule and having a perfluoropolyether structure in a main chain, (B) a fluorine-containing organohydrogensiloxane having, in one molecule, a monovalent perfluoroalkyl group or a monovalent perfluorooxyalkyl group, or having a divalent perfluoroalkylene group or a divalent perfluorooxyalkylene group, and further having two or more hydrogen atoms directly bonded to silicon atoms (SiH groups), and free of an epoxy group and an alkoxy group directly bonded to a silicon atom in the molecule, (C) 0.1 to 2,000 ppm in terms of the weight of platinum group metal atoms with respect to the component (A) of a platinum group metal-based catalyst, and (D) 0.01 parts by weight or more and less than 1 parts by weight of a cyclic organopolysiloxane having, in one molecule, a hydrogen atom directly bonded to a silicon atom (SiH group), and an epoxy group or trialkoxysilyl group bonded to a silicon atom via a divalent hydrocarbon group which may contain an oxygen atom, or both groups, and free of fluorine in the molecule, wherein the compounding amount of the component (B) is an amount such that the amount of hydrogen atoms directly bonded to silicon atoms in the component (B) is 0.5 to 3 mol, based on 1 mol of alkenyl groups contained in the composition, and the transmittance to light of 500 nm wavelength of the cured product having a thickness of 2 mm obtained by curing the composition is more than 85%, and the component (B) is at least one selected from the fluorine-containing organohydrogensiloxane having the following general formulas (13) to (17):

(13)

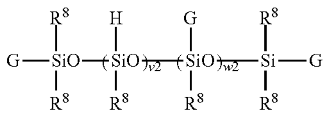

wherein G is each independently a monovalent perfluoroalkyl group or monovalent perfluorooxyalkyl group bonded to a silicon atom constituting siloxane via an unsubstituted or substituted divalent hydrocarbon group having 2 to 13 carbon atoms, $R^8$ is each independently an unsubstituted or substituted alkyl group or aryl group having 1 to 20 carbon atoms, and v2 is an integer of 2 to 50, w2 is an integer of 1 to 40, and v2+w2 is an integer of 4 to 60, provided that the order of bonding of —(Si(H)($R^8$)O)— and —(Si(G)($R^8$)O)— is not limited, (14)

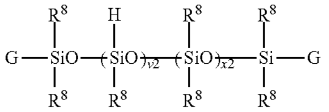

wherein G is each independently the same as G above, $R^8$ is each independently the same as $R^8$ above, and v2 is an integer of 2 to 50, x2 is an integer of 1 to 40, and v2+x2 is an integer of 4 to 60, provided that the order of bonding of —(Si(H)($R^8$)O)— and —(Si($R^8$)$_2$O)— is not limited, (15)

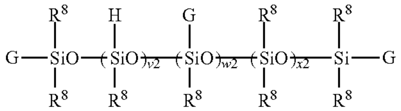

wherein G is each independently the same as G above, $R^8$ is each independently the same as $R^8$ above, and v2 is an integer of 2 to 50, w2 is an integer of 1 to 40, x2 is an integer of 1 to 40, and v2+w2+x2 is an integer of 5 to 60, provided that the order of bonding of —(Si(H)($R^8$)O)—, —(Si(G)($R^8$)O)— and —(Si($R^8$)$_2$O)— is not limited, (16)

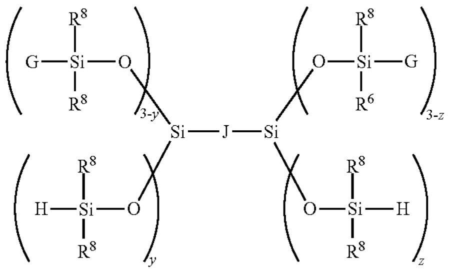

wherein J is an oxygen atom, an alkylene group, or a divalent perfluoroalkylene group or divalent perfluorooxyalkylene group each bonded to an adjacent silicon atom via a divalent hydrocarbon group which may have an oxygen atom or a nitrogen atom, G is each independently the same as G above, $R^8$ is each independently the same as $R^8$ above, and y is an integer of 0 to 3, z is an integer of 0 to 3, and y+z is an integer of 2 to 6, provided that, when J is an oxygen atom or an alkylene group, y+z is an integer of 2 to 5, and (17)

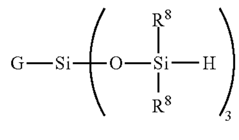

wherein G is the same as G above, and $R^8$ is each independently the same as $R^8$ above.

11. The optical component according to claim 10, wherein in the curable fluoropolyether adhesive agent composition, the alkenyl group content of the linear polyfluoro compound as the component (A) is 0.005 to 0.3 mol/100 g.

12. The optical component according to claim 10, wherein the perfluoropolyether structure of the component (A) contains a structure having the following general formula (1):

$$—(C_aF_{2a}O)_b— \quad (1)$$

wherein a is an integer of 1 to 6, and b is an integer of 1 to 300.

13. The optical component according to claim 10, wherein the component (A) is a linear polyfluoro compound having the following general formula (2):

(2)

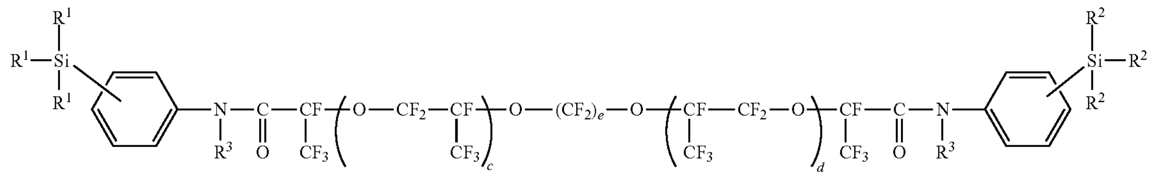

wherein $R^1$ and $R^2$ are alkenyl groups or monovalent hydrocarbon groups free of unsubstituted or substituted aliphatic unsaturated bond, $R^1$ is independent of each other, $R^2$ is also independent of each other, 2 or more of a total of 6 of $R^1$ and $R^2$ are alkenyl groups, $R^3$ is each independently a hydrogen atom or an unsubstituted or substituted monovalent hydrocarbon group, c and d are each an integer of 1 to 150, the average value of c+d is 2 to 300, and e is an integer of 1 to 6, and/or the following general formula (3):

(3)

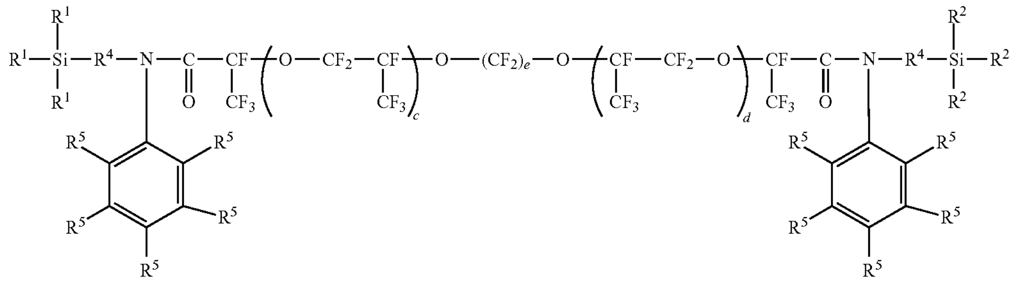

wherein $R^1$ and $R^2$ are alkenyl groups or monovalent hydrocarbon groups free of unsubstituted or substituted aliphatic unsaturated bond, $R^1$ is independent of each other, $R^2$ is also independent of each other, 2 or more of a total of 6 of $R^1$ and $R^2$ are an alkenyl group, $R^4$ is each independently an alkylene group having 1 to 6 carbon atoms, $R^5$ is each independently a hydrogen atom or an alkyl group having 1 to 4 carbon atoms which may be substituted with fluorine, c and d are each an integer of 1 to 150, the average value of c+d is 2 to 300, and e is an integer of 1 to 6.

14. The optical component according to claim 10, wherein the component (D) is a cyclic organopolysiloxane having the following general formula (4):

(4)

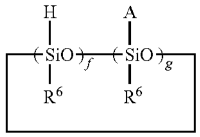

wherein f is an integer of 1 to 6, g is an integer of 1 to 4, and f+g is an integer of 4 to 10, $R^6$ is each independently an unsubstituted or substituted alkyl group or aryl group having 1 to 20 carbon atoms, and A is each independently an epoxy group or trialkoxysilyl group bonded to a silicon atom via a divalent hydrocarbon group which may contain an oxygen atom, provided that the order of bonding of —(SiO)(H)$R^6$— and —(SiO)(A)$R^6$— is not limited.

15. The optical component according to claim 10, wherein the curable fluoropolyether adhesive agent composition further comprises:

0.1 to 10 parts by weight of (E) a cyclic organopolysiloxane having, in one molecule, a hydrogen atom directly bonded to a silicon atom (SiH group), a monovalent perfluoroalkyl group or a monovalent perfluorooxyalkyl group, and an epoxy group or trialkoxysilyl group bonded to a silicon atom via a divalent hydrocarbon group which may contain an oxygen atom, or both groups, per 100 parts by weight of the component (A).

16. The optical component according to claim 10, wherein the component (E) is a cyclic organopolysiloxane having the following general formula (5):

(5)

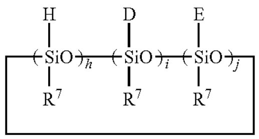

wherein h is an integer of 1 to 6, i is an integer of 1 to 4, j is an integer of 1 to 4, and h+i+j is an integer of 4 to 10, $R^7$ is each independently an unsubstituted or substituted alkyl group or aryl group having 1 to 20 carbon atoms, D is each independently a monovalent perfluoroalkyl group or a monovalent perfluorooxyalkyl group bonded to a silicon atom via a divalent hydrocarbon group which may contain a silicon atom, an oxygen atom and a nitrogen atom, and E is each independently an epoxy group or trialkoxysilyl group bonded to a silicon atom via a divalent hydrocarbon group which may contain an oxygen atom, provided that the order of bonding of —(SiO)(H)$R^7$—, —(SiO)(D)$R^7$— and —(SiO)(E)$R^7$— is not limited.

17. The optical component according to claim 10, wherein the cured product of the curable fluoropolyether adhesive agent composition is attached to a glass adherend.

18. The optical component according to claim 10, further comprising glass as a constituent material.

* * * * *